United States Patent
Nakano

(10) Patent No.: US 10,295,008 B2
(45) Date of Patent: May 21, 2019

(54) PRESSURE DAMPING DEVICE

(71) Applicant: Showa Corporation, Gyoda-shi (JP)

(72) Inventor: Gota Nakano, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/230,899

(22) Filed: Aug. 8, 2016

(65) Prior Publication Data
US 2017/0058987 A1   Mar. 2, 2017

(30) Foreign Application Priority Data

Aug. 25, 2015  (JP) .................................. 2015-165806

(51) Int. Cl.
| | |
|---|---|
| *F16F 9/34* | (2006.01) |
| *B60G 13/08* | (2006.01) |
| *F16F 9/19* | (2006.01) |
| *F16F 9/18* | (2006.01) |

(52) U.S. Cl.
CPC .............. *F16F 9/34* (2013.01); *B60G 13/08* (2013.01); *F16F 9/19* (2013.01); *B60G 2202/24* (2013.01); *B60G 2500/11* (2013.01); *F16F 9/185* (2013.01)

(58) Field of Classification Search
CPC ............. F16F 9/34; F16F 9/348; F16F 9/3481
See application file for complete search history.

(56) References Cited

U.S. PATENT DOCUMENTS

| | | | | |
|---|---|---|---|---|
| 4,463,839 A | * | 8/1984 | Ashiba ..................... | F16F 9/462 188/282.4 |
| 4,624,347 A | * | 11/1986 | Mourray .................. | F16F 9/348 137/493.9 |
| 4,821,851 A | * | 4/1989 | Kruckemeier .......... | F16F 9/468 188/282.4 |
| 5,064,032 A | | 11/1991 | Ashiba | |

(Continued)

FOREIGN PATENT DOCUMENTS

| | | |
|---|---|---|
| CN | 101093009 A | 12/2007 |
| CN | 102207159 A | 10/2011 |

(Continued)

OTHER PUBLICATIONS

Chinese Office Action dated Dec. 26, 2018 for Chinese Application No. 201610670043 (partial machine translation from Global Dossier is attached).

(Continued)

*Primary Examiner* — Bradley T King
(74) *Attorney, Agent, or Firm* — Leason Ellis LLP

(57) ABSTRACT

A pressure damping device includes a cylinder, a partitioning section, a flow channel formation section, a valve section a bypass channel and a throttle section. The flow channel formation section forms a flow channel, through which the fluid flows, in conjunction with a movement of the partitioning section. The valve section controls a flow of the fluid in the flow channel of the flow channel formation section. The bypass channel forms a flow of the fluid that bypasses the flow of the fluid flowing through the flow channel while opening the valve section. The throttle section that throttles the flow of the fluid through the bypass channel further on an outer side than the valve section with respect to the flow channel formation section.

4 Claims, 15 Drawing Sheets

(56) References Cited

U.S. PATENT DOCUMENTS

| | | | |
|---|---|---|---|
| 5,293,971 A * | 3/1994 | Kanari | F16F 9/468 |
| | | | 188/282.1 |
| 5,425,436 A * | 6/1995 | Teramura | B60G 17/018 |
| | | | 188/266.1 |
| 6,202,805 B1 | 3/2001 | Okada et al. | |
| 6,220,409 B1 * | 4/2001 | Deferme | F16F 9/3228 |
| | | | 188/282.1 |
| 2002/0020595 A1 * | 2/2002 | Adamek | F16F 9/3484 |
| | | | 188/280 |
| 2003/0106753 A1 * | 6/2003 | Nezu | B60G 17/08 |
| | | | 188/322.15 |
| 2005/0056501 A1 * | 3/2005 | de Molina | F16F 9/34 |
| | | | 188/284 |
| 2006/0225976 A1 * | 10/2006 | Nakadate | F16F 9/464 |
| | | | 188/266 |
| 2007/0125610 A1 | 6/2007 | Goetz et al. | |
| 2009/0107782 A1 * | 4/2009 | Ota | F16F 9/3485 |
| | | | 188/282.5 |
| 2011/0226572 A1 | 9/2011 | Heyn et al. | |
| 2015/0114774 A1 * | 4/2015 | Kim | F16F 9/348 |
| | | | 188/322.15 |

FOREIGN PATENT DOCUMENTS

| | | |
|---|---|---|
| CN | 103982584 A | 8/2014 |
| JP | 58-081245 A | 5/1983 |
| JP | 62-087233 U | 6/1987 |
| JP | 02-278027 A | 11/1990 |
| JP | 04-266635 A | 9/1992 |
| JP | 06-13392 Y | 4/1994 |
| JP | 08-223994 A | 8/1996 |
| JP | 11-173366 A | 6/1999 |

OTHER PUBLICATIONS

Office Action dated Jan. 22, 2019 for the corresponding Japanese Patent Application No. 2015-165806 (an English translation attached hereto).

* cited by examiner

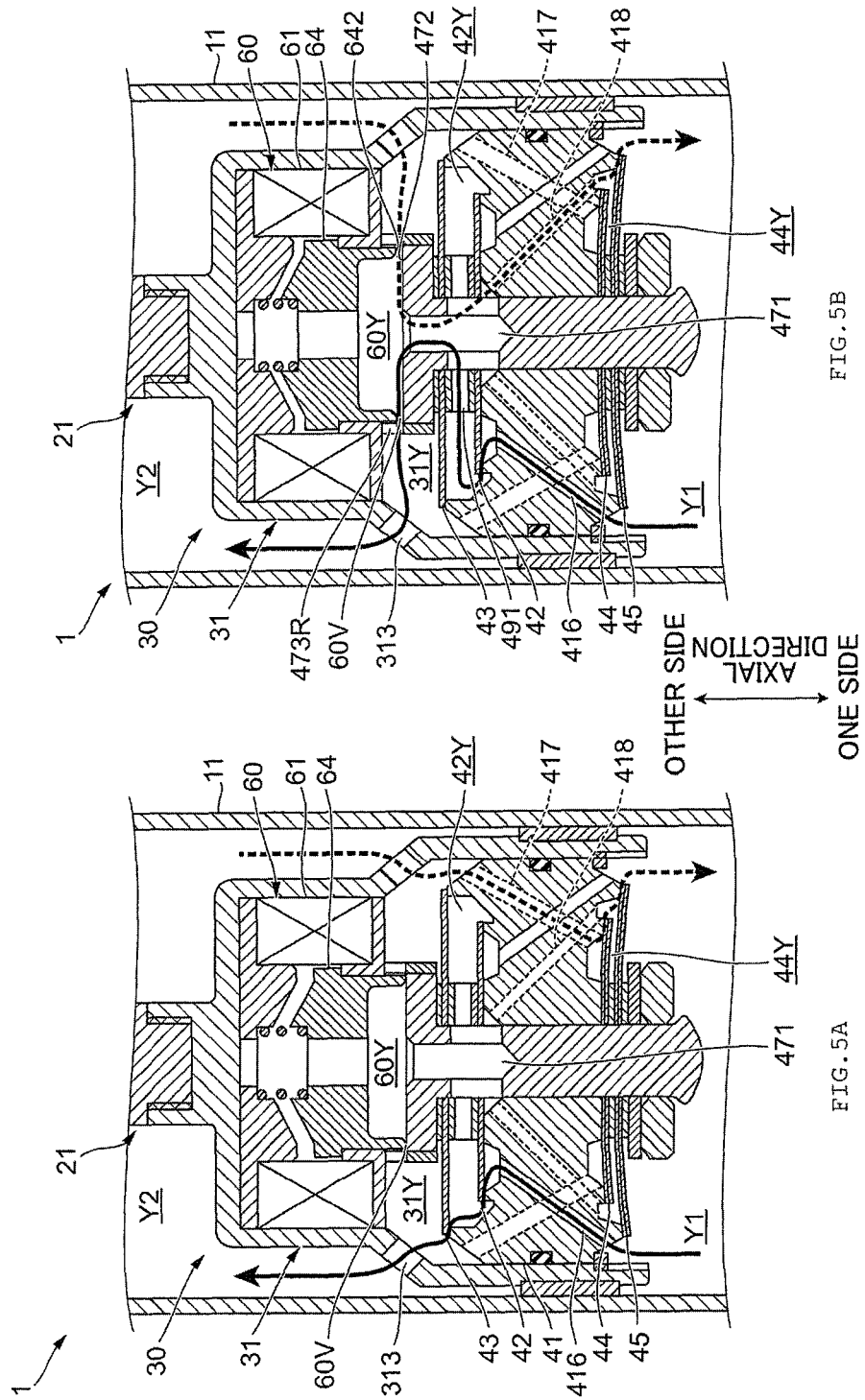

PRESSURE DAMPING DEVICE

CROSS-REFERENCE TO RELATED APPLICATION

The present application claims priority under 35 U.S.C. § 119 to Japanese Patent Application No. 2015-165806, filed Aug. 25, 2015. The contents of this application are incorporated herein by reference in their entirety.

BACKGROUND

Field

The present invention relates to a pressure damping device.

Related Art

A suspension device of a vehicle such as an automobile is provided with a pressure damping device which dampens vibration transmitted from a road surface to the vehicle during traveling. In addition, among pressure damping devices of this type, a pressure damping device that enables a generated damping force to be varied is known (for example, refer to JP H0613392 (Y2)).

Patent Document 1: JP H0613392 (Y2)

SUMMARY

In a pressure damping device that enables a damping force to be varied, favorably, machining of the pressure damping device can be easily performed.

An object of the present disclosure is to enable a pressure damping device, which is capable of varying a damping force, to be easily machined.

To achieve the object described above, the present disclosure provides a pressure damping device including: a cylinder that extends from one side toward another side and that houses a fluid; a partitioning section that is provided so as to be movable in an axial direction in the cylinder and that partitions a space in the cylinder into a first chamber and a second chamber; a flow channel formation section in which a flow channel, through which the fluid flows, is formed in conjunction with a movement of the partitioning section; a valve section that controls a flow of the fluid in the flow channel of the flow channel formation section; a bypass channel that forms a flow of the fluid that bypasses the flow of the fluid flowing through the flow channel while opening the valve section; and a throttle section that throttles the flow of the fluid through the bypass channel further on an outer side than the valve section with respect to the flow channel formation section.

By adopting the configuration described above, since a structure is realized in which a throttle section throttles a flow of a fluid in a bypass channel further on an outer side than a valve section with respect to a flow channel formation section, a pressure damping device capable of varying a damping force can be easily machined.

According to the present disclosure, a pressure damping device capable of varying a damping force can be easily machined.

BRIEF DESCRIPTION OF THE DRAWINGS

FIGS. 5A and 5B are explanatory diagrams of operations of the hydraulic damping device according to the first modification.

DESCRIPTION OF THE EMBODIMENTS

Hereinafter, embodiments of the present invention will be described in detail with reference to the accompanying drawings.

First Embodiment

Figure 1:
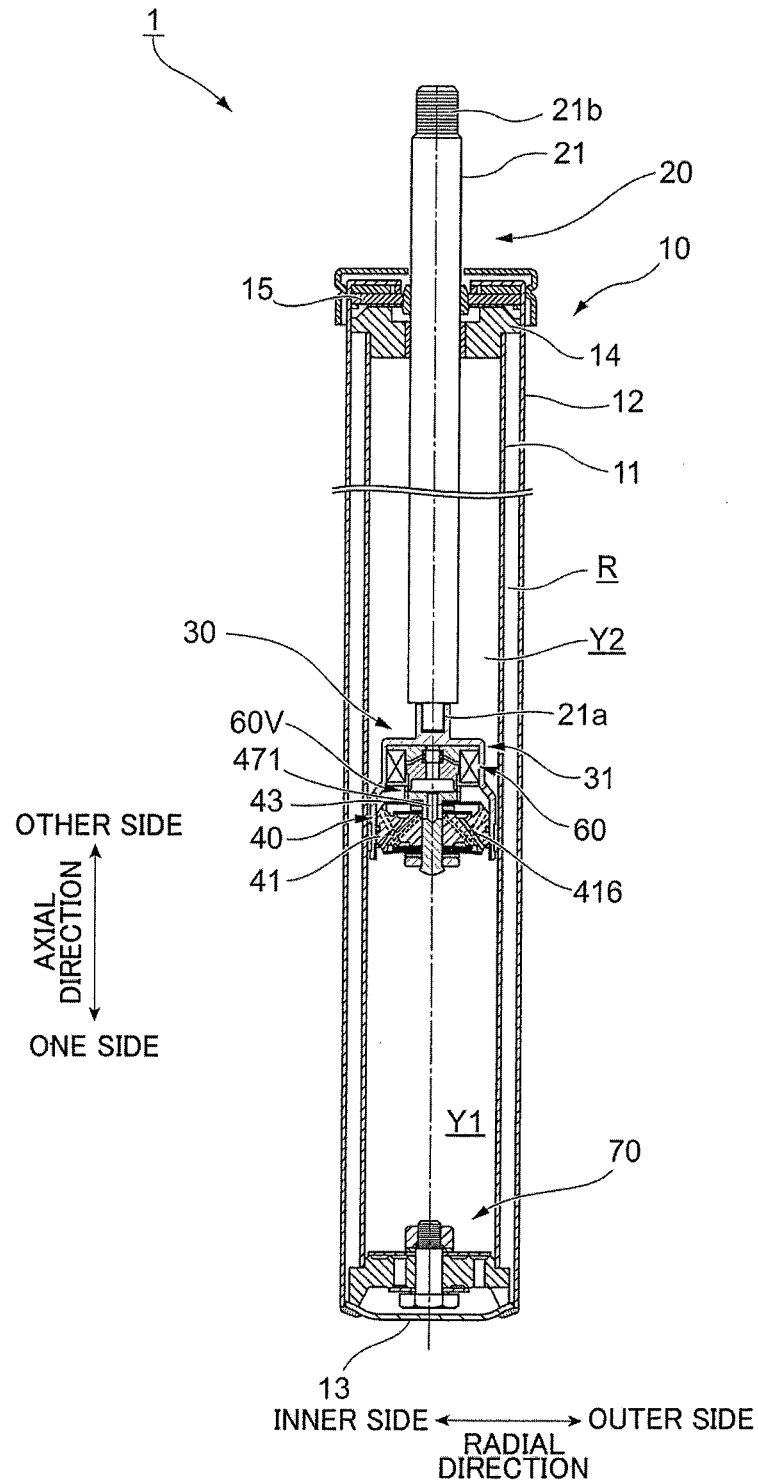
FIG. 1 is an overall configuration diagram of a hydraulic damping device according to a first embodiment.

FIG. 1 is an overall configuration diagram of a hydraulic damping device 1 according to a first embodiment.

In the following description, a lower side in FIG. 1 in an axial direction of the hydraulic damping device 1 shown in FIG. 1 will be referred to as "one side" and an upper side in FIG. 1 will be referred to as "another side". In addition, a center of the hydraulic damping device 1 in a radial direction will be referred to as an "inner side in the radial direction" and an outer side in the radial direction will be referred to as an "outer side in the radial direction".

[Configuration and Functions of Hydraulic Damping Device 1]

As shown in FIG. 1, the hydraulic damping device 1 (a pressure damping device according to the present invention) includes a cylinder section 10, a rod section 20 which is provided so that the other side thereof protrudes outside of the cylinder section 10 and the one side thereof is slidably inserted into the cylinder section 10, a piston constituting section 30 which is provided at a one side-end of the rod section 20, and a bottom valve section 70 which is provided at a one side-end of the cylinder section 10.

In addition, although not illustrated, the hydraulic damping device 1 is provided between a vehicle body and an axle in a four-wheel automobile, a motorcycle, and the like to dampen vibrational movement of the rod section 20 with respect to the cylinder section 10.

Next, a general configuration of the hydraulic damping device 1 according to the first embodiment will be described.

As shown in FIG. 1, the hydraulic damping device 1 includes: a cylinder 11 which extends from one side toward another side and which houses oil (a fluid); a housing 31 (a partitioning section) which is provided so as to be movable in an axial direction in the cylinder 11 and which partitions a space in the cylinder 11 into a first oil chamber Y1 (a first chamber) and a second oil chamber Y2 (a second chamber); a valve seat 41 (a flow channel formation section) in which a compression side oil channel 416 (a flow channel) through which the oil flows is formed in conjunction with a movement of the housing 31; a compression side second valve 43 (a valve section) which controls a flow of the oil in the compression side oil channel 416 of the valve seat 41; a bypass oil channel 471 (a bypass channel) which forms a flow of the oil that bypasses the flow of the oil flowing through the compression side oil channel 416 while opening the compression side second valve 43; and a throttle section 60V which throttles the flow of the oil through the bypass oil channel 471 further on the outer side (more specifically, the other side in the axial direction) than the compression side second valve 43 with respect to the valve seat 41. Hereinafter, these components will be described in detail.

The cylinder section 10 includes the cylinder 11, an outer cylindrical body 12 which is provided on the outer side of the cylinder 11, and a bottom section 13 which is provided at a one side-end of the outer cylindrical body 12. In addition, in the present embodiment, a reservoir chamber R which stores oil is formed between the cylinder 11 and the outer cylindrical body 12.

Furthermore, the cylinder section 10 includes a rod guide 14 which is provided at another side-end of the cylinder 11 and a seal member 15 which closes another side-end of the outer cylindrical body 12.

In the present embodiment, the rod section 20 includes a rod member 21 which is formed to as to extend in an axial direction, a one side-mounting section 21a which is provided at a one side-end of the rod member 21, and another side-mounting section 21b which is provided at another side-end of the rod member 21.

The one side-mounting section 21a of the rod member 21 holds the piston constituting section 30. In addition, a coupling member (not shown) for coupling the hydraulic damping device 1 to a vehicle body of an automobile or the like is mounted to the other side-mounting section 21b of the rod member 21.

The piston constituting section 30 includes the housing 31, a piston section 40 which is provided on an inner side of the housing 31 in the radial direction, and a damping force changing section 60 which is provided on the other side of the piston section 40.

Moreover, the respective components of the piston constituting section 30 will be described in detail later.

In addition, in the present embodiment, the piston constituting section 30 divides a space in the cylinder 11 into a first oil chamber Y1 and a second oil chamber Y2 which house oil. In the present embodiment, the first oil chamber Y1 is formed on the one side of the piston constituting section 30 (a piston ring 314 to be described later) and the second oil chamber Y2 is formed on the other side of the piston constituting section 30.

The bottom valve section 70 is provided on a one side-end of the hydraulic damping device 1 and divides the first oil chamber Y1 and the reservoir chamber R from each other.

[Configuration and Function of Piston Constituting Section 30]

Figure 2:
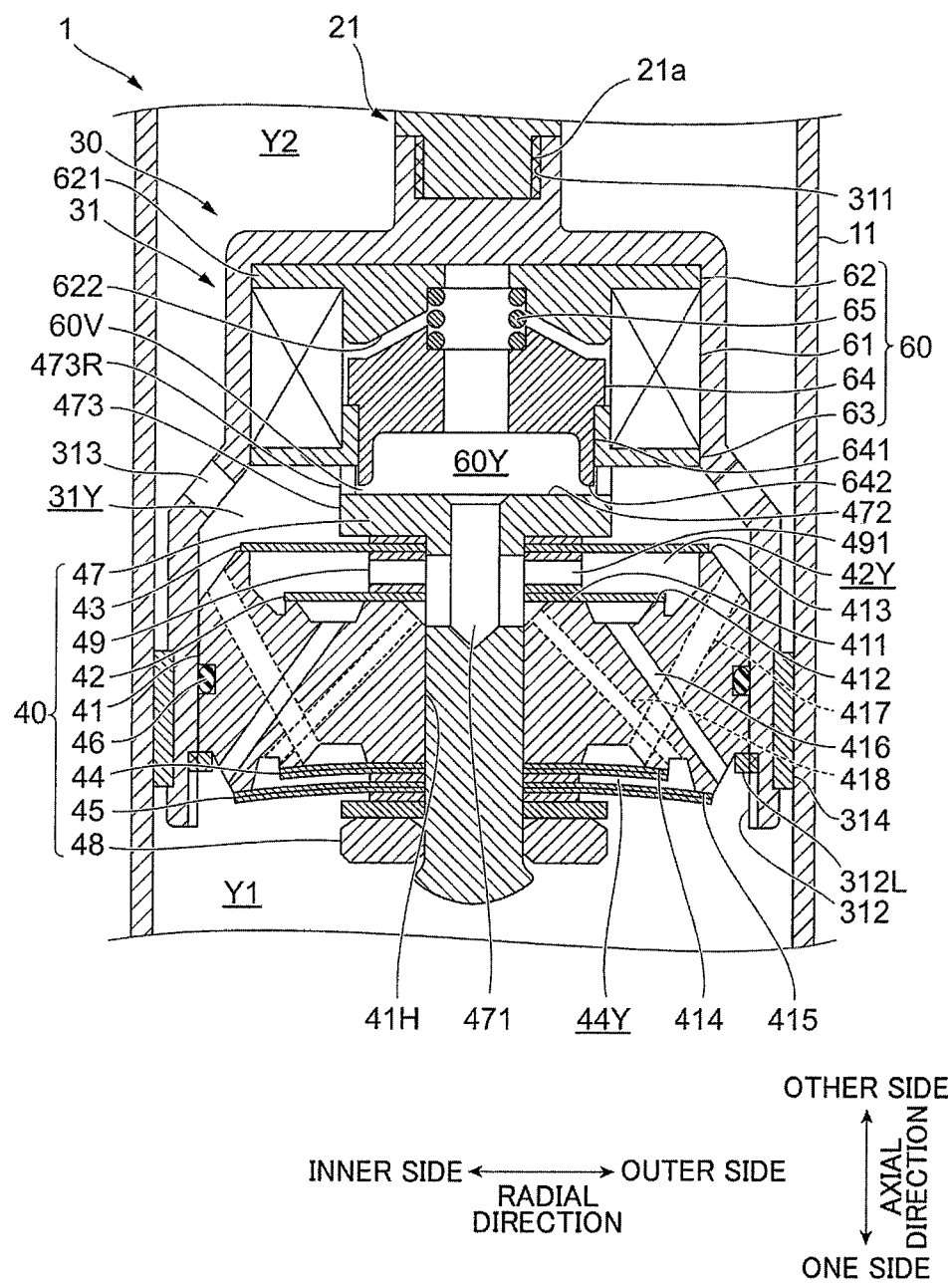
FIG. 2 is a sectional view showing a piston constituting section according to the first embodiment.

FIG. 2 is a sectional view of the piston constituting section 30 according to the first embodiment.

Figure 3:
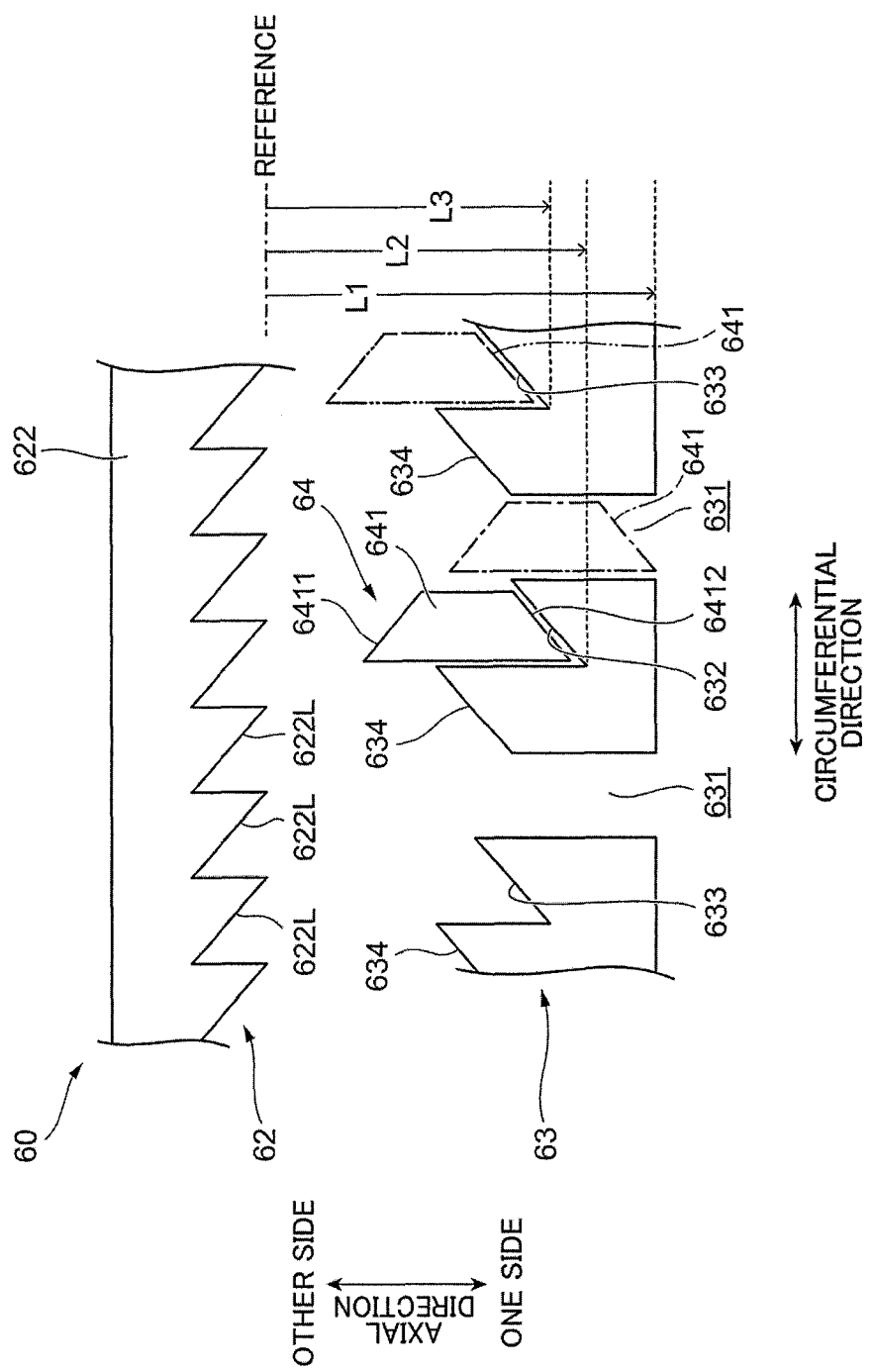
FIG. 3 is a conceptual diagram of a damping force changing section according to the first embodiment.

FIG. 3 is a conceptual diagram of the damping force changing section 60 according to the first embodiment.

[Housing 31]

As shown in FIG. 2, the housing 31 is a hollow member which opens on the one side. In addition, the housing 31 includes a rod connecting section 311 which is provided on the other side, a holding section 312 which is provided on the one side, an opening 313 which is provided on the one side of the rod connecting section 311, and the piston ring 314 which is provided on an outer circumference of the housing 31. Furthermore, an outer diameter of the housing 31 is smaller than an inner diameter of the cylinder 11. Moreover, the housing 31 forms a housing inner chamber 31Y on the inner side in the radial direction which is also the other side of the piston section 40.

The rod connecting section 311 is a screw hole which is formed so as to extend in the axial direction. The one side-mounting section 21a of the rod member 21 is fixed to the rod connecting section 311. In addition, the rod connecting section 311 is provided with a seal member (not shown) which provides a seal between the rod connecting section 311 and the one side-mounting section 21a.

The holding section 312 holds a fixing member 312L that fixes the piston section 40 and the damping force changing section 60 which are housed in the housing 31.

The opening 313 is an opening approximately facing the radial direction. In addition, the opening 313 is provided in plurality in the circumferential direction of the housing 31. Furthermore, the plurality of openings 313 are arranged at equal intervals in the circumferential direction.

The piston ring 314 is provided so as to be in slidable contact with an inner circumferential surface of the cylinder 11. The piston ring 314 reduces frictional resistance between the housing 31 and the cylinder 11.

[Piston Section 40]

The piston section 40 includes the valve seat 41, a compression side first valve 42 which is provided on the other side of the valve seat 41, a compression side second valve 43 which is provided on the other side of the compression side first valve 42, an extension side first valve 44 which is provided on the one side of the valve seat 41, an extension side second valve 45 which is provided on the one side of the extension side first valve 44, a seal member 46 which is provided between the valve seat 41 and the housing 31, a bolt 47, a nut 48, and a compression side inter-valve member 49 which is provided between the compression side first valve 42 and the compression side second valve 43. In addition, a compression side inter-valve chamber 42Y into which oil flows is formed between the compression side first valve 42 and the compression side second valve 43.

(Valve Seat 41)

The valve seat 41 is an approximately columnar member which includes an opening 41H through which the bolt 47 is passed. In addition, the valve seat 41 includes a compression side first annular section 411 which is provided on the other side, a compression side second annular section 412 which is provided on the other side, a compression side third annular section 413 which is provided on the other side, an extension side first annular section 414 which is provided on the one side, an extension side second annular section 415 which is provided on the one side, a compression side oil channel 416, an extension side first oil channel 417, and an extension side second oil channel 418.

The compression side first annular section 411 is formed in an approximate ring shape on the outer side in the radial direction of the opening 41H. In addition, the compression side first annular section 411 protrudes toward the other side in the axial direction.

The compression side second annular section 412 is formed in an approximate ring shape on the outer side in the radial direction of the compression side first annular section 411. In addition, the compression side second annular section 412 protrudes toward the other side in the axial direction. Moreover, in the first embodiment, a protrusion height of the compression side second annular section 412 is formed at an approximately same height as the compression side first annular section 411.

The compression side third annular section 413 is formed in an approximate ring shape on the outer side in the radial direction of the compression side second annular section 412. In addition, the compression side third annular section 413 protrudes toward the other side in the axial direction. A protrusion height of the compression side third annular section 413 is higher than the compression side second annular section 412. In other words, another side-end of the compression side third annular section 413 is positioned further on the other side than the compression side second annular section 412.

The extension side first annular section 414 is formed in an approximate ring shape on the outer side in the radial direction of the opening 41H. In addition, the extension side first annular section 414 protrudes toward the one side in the axial direction.

The extension side second annular section 415 is formed in an approximate ring shape on the outer side in the radial direction of the extension side first annular section 414. In addition, the extension side second annular section 415 protrudes toward the one side in the axial direction. A protrusion height of the extension side second annular section 415 is higher than the extension side first annular section 414. In other words, a one side-end of the extension side second annular section 415 is positioned further on the one side than the extension side first annular section 414.

The compression side oil channel 416 has a one side-oil port positioned on the outer side of the extension side second annular section 415 in the radial direction and another side-oil port positioned between the compression side first annular section 411 and the compression side second annular section 412.

The extension side first oil channel 417 has a one side-oil port positioned on the inner side of the extension side first annular section 414 in the radial direction and another side-oil port positioned on the outer side of the compression side third annular section 413 in the radial direction.

The extension side second oil channel 418 has a one side-oil port positioned between the extension side first annular section 414 and the extension side second annular section 415 and another side-oil port positioned on the inner side of the extension side first annular section 414 in the radial direction. In addition, in the first embodiment, the extension side second oil channel 418 connects to the bypass oil channel 471 (a bypass channel) inside the valve seat 41 separately from the compression side oil channel 416 and the extension side first oil channel 417 (a flow channel).

(Compression Side First Valve 42)

The compression side first valve 42 is constituted by a disc-shaped metal plate material. In addition, the compression side first valve 42 is configured so as to be capable of coming into contact with the compression side first annular section 411 and the compression side second annular section 412. Furthermore, the compression side first valve 42 opens the compression side oil channel 416 when oil flows through the compression side oil channel 416 toward the second oil chamber Y2. Moreover, the compression side first valve 42 always opens the other side of the extension side second oil channel 418.

(Compression Side Second Valve 43)

The compression side second valve 43 is constituted by a disc-shaped metal plate material. In addition, the compression side second valve 43 is configured so as to be capable of coming into contact with the compression side third annular section 413. Furthermore, the compression side second valve 43 is configured so as to be less deformable than the compression side first valve 42. In the first embodiment, the compression side second valve 43 is configured so as not to open at least under oil pressure that applies when the compression side first valve 42 starts to open. Moreover, the compression side second valve 43 (an outer side-valve) extends further to the outer side in the radial direction than the compression side first valve 42 (an inner side-valve) with respect to the valve seat 41 and operates so as to close when oil flows though the bypass oil channel 471 (a bypass channel) as will be described later.

(Extension Side First Valve 44)

The extension side first valve 44 is constituted by a disc-shaped metal plate material. In addition, the extension side first valve 44 is configured so as to be capable of coming into contact with the extension side first annular section 414. Furthermore, the extension side first valve 44 opens the extension side first oil channel 417 when oil flows through the extension side first oil channel 417 toward the first oil chamber Y1. Moreover, the extension side first valve 44 is configured so as to be less deformable than the extension side second valve 45. In the first embodiment, the extension side first valve 44 is configured so as not to open at least under oil pressure that applies when the extension side second valve 45 starts to open.

(Extension Side Second Valve 45)

The extension side second valve 45 is constituted by a disc-shaped metal plate material. In addition, the extension side second valve 45 is configured so as to be capable of coming into contact with the extension side second annular section 415. Furthermore, the extension side second valve 45 opens the extension side first oil channel 417 when oil flows through the extension side first oil channel 417 toward the first oil chamber Y1. Moreover, the extension side second valve 45 opens the extension side second oil channel 418 when oil flows through the extension side second oil channel 418 toward the first oil chamber Y1.

Moreover, settings of oil pressure that applies when the extension side first valve 44 and the extension side second valve 45 open are not limited to the settings described in the embodiment above and other settings may be adopted.

In the first embodiment, the bolt 47 is fixed to a one side-end of the rod member 21. In addition, together with the nut 48, the bolt 47 sandwiches and holds the valve seat 41, the compression side first valve 42, the compression side second valve 43, the extension side first valve 44, the extension side second valve 45, and the compression side inter-valve member 49.

Furthermore, the bolt 47 includes the bypass oil channel 471, an opposing section 472 formed on the other side, and a connecting section 473 formed on the other side and further on the outer side in the radial direction than the opposing section 472.

The bypass oil channel 471 is formed in the axial direction on the other side of the bolt 47. In addition, the bypass oil channel 471 penetrates the bolt 47 in the radial direction in a part of the bolt 47 but does not penetrate the bolt 47 in the axial direction. More specifically, the bypass oil channel 471 communicates with an adjustment chamber 60Y (to be described later) on the other side and communicates with an opening 491 (to be described later) on the one side.

The opposing section 472 is formed at a position that opposes a protruding section 642 of the damping force changing section 60.

The connecting section 473 comes into contact with a second cam housing 63 (to be described later) of the damping force changing section 60. In addition, the connecting section 473 forms a connection location with the damping force changing section 60. Furthermore, the connecting section 473 includes a plurality of openings 473R.

(Compression Side Inter-Valve Member 49)

The compression side inter-valve member 49 includes an opening 491 that penetrates the compression side inter-valve member 49 in the radial direction. In addition, an inner side in the radial direction of the opening 491 communicates with the bypass oil channel 471. Meanwhile, an outer side in the radial direction of the opening 491 faces the compression side inter-valve chamber 42Y.

[Damping Force Changing Section 60]

As shown in FIG. 2, the damping force changing section 60 includes a solenoid 61, a first cam housing 62 which is provided on the other side, the second cam housing 63 which is provided on the one side, a shutter valve 64 which is provided between the first cam housing 62 and the second cam housing 63, and a spring 65 which is provided on the other side of the shutter valve 64.

(Solenoid 61)

The solenoid 61 is controlled by a control unit (not shown) via a conductive wire (not shown). In addition, the solenoid 61 generates a magnetic field when energized. In the first embodiment, the solenoid 61 moves the shutter valve 64 to the other side with a generated magnetic field.

(First Cam Housing 62)

The first cam housing 62 includes a flange section 621 formed on the other side and a cylindrical section 622 formed on the one side.

The flange section 621 is fixed to the housing 31 by being press-fitted into an inner circumference of the housing 31 and pressed against the housing 31 toward the other side by the solenoid 61.

As shown in FIG. 3, the cylindrical section 622 includes a plurality of first inclined surface sections 622L. The plurality of first inclined surface sections 622L are continuously formed in the circumferential direction of the first cam housing 62.

(Second Cam Housing 63)

As shown in FIG. 3, the second cam housing 63 includes a plurality of first depressed sections 631, a plurality of second depressed sections 632, a plurality of third depressed sections 633, and a plurality of second inclined surface sections 634. In addition, in the first embodiment, the first depressed section 631, the second inclined surface section 634, the second depressed section 632, the first depressed section 631, the second inclined surface section 634, the third depressed section 633, and the first depressed section 631 are respectively cyclically arranged in this order in the circumferential direction of the second cam housing 63.

Furthermore, the first depressed section 631 is configured such that a distance from a prescribed reference (for example, a one side-end of the first cam housing 62) on the other side is a distance L1 which is longer than distances to the second depressed section 632 and the third depressed section 633. The second depressed section 632 is configured such that a distance from the reference is a distance L2 which is shorter than a distance to the first depressed section 631. The third depressed section 633 is configured such that a distance from the reference is a distance L3 which is shorter than a distance to the second depressed section 632. In this manner, the first depressed section 631, the second depressed section 632, and the third depressed section 633 are respectively configured such that depths thereof from the reference on the other side in one direction become sequentially shallower.

Moreover, an order of arrangement of the first depressed section 631, the second depressed section 632, and the third depressed section 633 in the circumferential direction is not limited to the order described above and other configurations may be adopted instead.

(Shutter Valve 64)

As shown in FIG. 2, the shutter valve 64 includes a guided section 641 which is provided on the outer side in the radial direction and a protruding section 642 which is provided on the one side. In addition, the protruding section 642 forms the throttle section 60V which throttles a flow of oil between the protruding section 642 and the opposing section 472 of the bolt 47. Furthermore, the shutter valve 64 forms the adjustment chamber 60Y which is a space into which oil flows between the shutter valve 64 and the bolt 47. Moreover, in the first embodiment, the throttle section 60V is provided on an outer side-end of the piston section 40.

As shown in FIG. 3, the guided section 641 includes a first guided section 6411 formed on the other side and a second guided section 6412 formed on the one side.

The first guided section 6411 includes an inclined surface. In addition, the inclined surface of the first guided section 6411 is formed so as to conform to the first inclined surface section 622L of the first cam housing 62. The first guided section 6411 is a portion to be guided by the first cam housing 62 in a state where the shutter valve 64 is pressed against the first guided section 6411 toward the other side.

The second guided section 6412 includes an inclined surface. In addition, the inclined surface of the second guided section 6412 is formed so as to conform to the second inclined surface section 634, the second depressed section 632, and the third depressed section 633 of the second cam housing 63. Furthermore, the second guided section 6412 is a portion to be guided by the second cam housing 63 in a state where the shutter valve 64 is pressed against the second guided section 6412 toward the one side.

(Spring 65)

As shown in FIG. 2, with the spring 65, the one side thereof is in contact with the shutter valve 64 and the other side thereof is in contact with the first cam housing 62. In addition, the spring 65 imparts, to the shutter valve 64, a force that causes the shutter valve 64 to move toward the one side.

In the damping force changing section 60 configured as described above, the shutter valve 64 (a protruding member) rotates by being driven in the axial direction by the solenoid 61 (a driving section) and, at the same time, protrudes toward the bypass oil channel 471 (a bypass channel) by a prescribed protrusion amount in accordance with an amount of rotation. In addition, the shutter valve 64 changes an interval between the protruding section 642 and the opposing section 472 (a throttle amount of oil) in accordance with a protrusion amount (a position) of the shutter valve 64 in the axial direction. Accordingly, the shutter valve 64 throttles a flow of oil that flows through the bypass oil channel 471 as will be described later.

As described above, in the first embodiment, depths toward the one side increases in an order of the third depressed section 633, the second depressed section 632, and the first depressed section 631 (refer to FIG. 3). Therefore, in a state where the guided section 641 is fitted into the first depressed section 631 (depicted by a dashed-dotted line in FIG. 3), the protrusion amount of the protruding section 642 toward the one side assumes a maximum value. In addition, the damping force changing section 60 forms a "closed state" where the protruding section 642 and the opposing section 472 come into contact with each other and closes the bypass oil channel 471. Furthermore, in a state where the guided section 641 is fitted into the second depressed section 632 (depicted by a solid line in FIG. 3), the damping force changing section 60 forms a "first opened state" where oil flows more readily through the bypass oil channel 471 than in the closed state. Moreover, in a state where the guided section 641 is fitted into the third depressed section 633 (depicted by a dashed-two dotted line in FIG. 3), the damping force changing section 60 forms a "second opened state" where oil flows more readily through the bypass oil channel 471 than in the first opened state.

<Operations of Damping Force Changing Section 60>

Figure 4A:
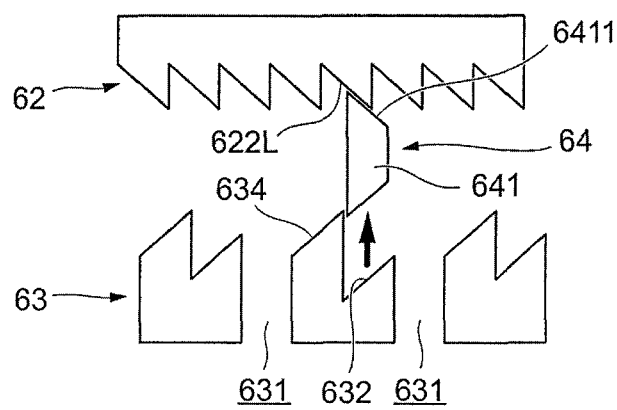
FIGS. 4A to 4C are explanatory diagrams of operations of the damping force changing section.
Figure 4B:
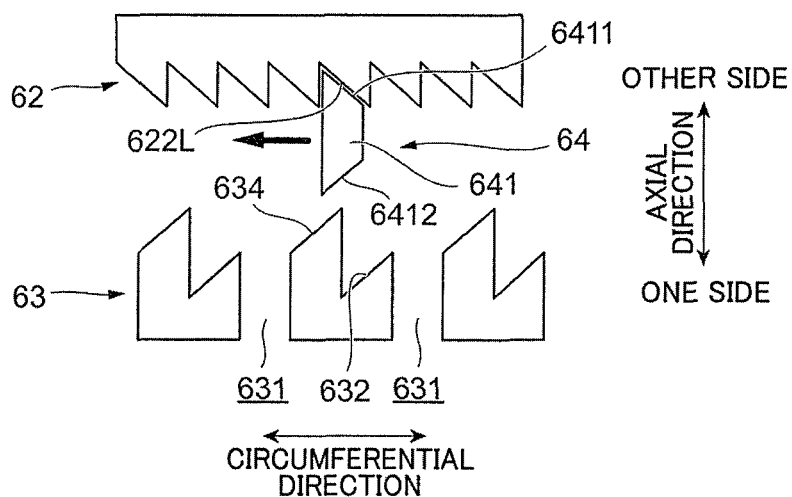
Figure 4C:
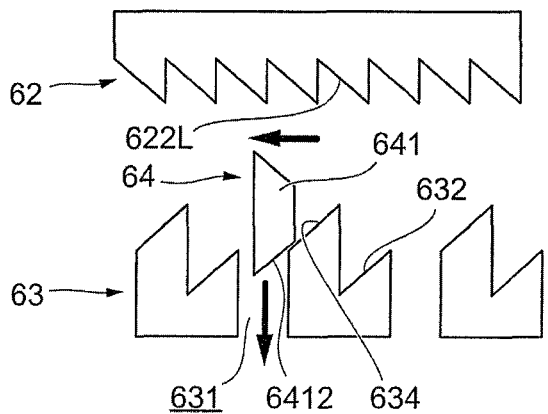

FIGS. 4A to 4C are explanatory diagrams of operations of the damping force changing section 60.

Hereinafter, operations when the shutter valve 64 rotates due to energization of the solenoid 61 (refer to FIG. 2) in the damping force changing section 60 will be described.

With reference to the example shown in FIG. 4A, operations from a state where the second guided section 6412 of the guided section 641 is fitted into the second depressed section 632 will be described. Moreover, as described above, this state constitutes a first opened state.

In addition, in the damping force changing section 60, the solenoid 61 moves the shutter valve 64 to the other side. As a result, as shown in FIG. 4B, the first guided section 6411 of the guided section 641 comes into contact with the first inclined surface section 622L of the first cam housing 62. In addition, the first guided section 6411 slides on the first inclined surface section 622L. As a result, the shutter valve 64 rotates in the circumferential direction as a whole.

Subsequently, the damping force changing section 60 suspends energization of the solenoid 61. As a result, the shutter valve 64 is pressed toward the one side by the spring 65 (refer to FIG. 2). At this point, in the example shown in FIG. 4C, the second guided section 6412 comes into contact with the second inclined surface section 634. In addition, the second guided section 6412 slides on the second inclined surface section 634 and the shutter valve 64 rotates in the circumferential direction as a whole.

Furthermore, eventually, a state where the guided section 641 is fitted into the first depressed section 631 is created. As described earlier, this state constitutes a closed state.

In a similar manner, by performing energization and suspension thereof of the solenoid 61 once, the shutter valve 64 rotates by an amount of rotation (angle) determined in advance. In addition, the guided section 641 of the shutter valve 64 moves to other adjacent depressed sections (the first depressed section 631, the second depressed section 632, and the third depressed section 633) in accordance with the amount of rotation.

The solenoid 61 is energized only when the shutter valve 64 is rotated. In other words, once the shutter valve 64 is positioned at a predetermined rotational position, the solenoid 61 need not be energized. The rotational position of the shutter valve 64 is maintained by the second cam housing 63 which meshes with the shutter valve 64 and by the spring 65. Therefore, with the hydraulic damping device 1 according to the first embodiment, a state of the shutter valve 64 is maintained even in a state where power is not supplied as compared to electric drive sources such as the solenoid 61.

Operations of Hydraulic Damping Device 1
According to First Embodiment

FIGS. 5A and 5B are explanatory diagrams of operations of the hydraulic damping device 1 according to the first embodiment.

Moreover, in FIGS. 5A and 5B, a flow of oil during a compression stroke will be depicted by a solid line and a flow of oil during an extension stroke will be depicted by a dashed line. In addition, FIG. 5A is a diagram showing a case where the closed state is formed in the damping force changing section 60. FIG. 5B is a diagram showing a case where the first opened state is formed in the damping force changing section 60.

First, a flow of oil when the closed state is formed in the damping force changing section 60 will be described. In addition, hereinafter, descriptions applicable during a compression stroke and during an extension stroke will be respectively given in this order.

(During Compression Stroke/Closed State)

When the piston constituting section 30 moves to the one side in the axial direction with respect to the cylinder 11, as indicated by a solid line arrow in FIG. 5A, oil in the first oil chamber Y1 flows through the compression side oil channel 416 and flows out to the compression side inter-valve chamber 42Y while pressing and opening the compression side first valve 42. Furthermore, the oil having flowed out to the compression side inter-valve chamber 42Y passes through the housing inner chamber 31Y and the opening 313 and flows out to the second oil chamber Y2 while pressing and opening the compression side second valve 43.

As described above, during a compression stroke in the closed state, a damping force is mainly generated by resistance created when oil flows through the compression side oil channel 416, the compression side first valve 42, and the compression side second valve 43.

In addition, as shown in FIG. 1, in the bottom valve section 70, the oil in the first oil chamber Y1 flows out to the reservoir chamber R due to a movement of the piston constituting section 30 to the one side in the axial direction.

(During Extension Stroke/Closed State)

As indicated by a dashed line arrow in FIG. 5A, when the piston constituting section 30 moves to the other side in the axial direction with respect to the cylinder 11, oil in the second oil chamber Y2 flows through the opening 313, the housing inner chamber 31Y, and the extension side first oil channel 417 and flows out to the extension side inter-valve chamber 44Y while pressing and opening the extension side first valve 44. Furthermore, the oil having flowed out to the extension side inter-valve chamber 44Y flows out to the first oil chamber Y1 while pressing and opening the extension side second valve 45.

As described above, during an extension stroke in the closed state, a damping force is mainly generated by resistance created when oil flows through the extension side first oil channel 417, the extension side first valve 44, and the extension side second valve 45.

In addition, as shown in FIG. 1, in the bottom valve section 70, the oil in the reservoir chamber R flows into the first oil chamber Y1 due to a movement of the piston constituting section 30 to the other side in the axial direction.

Next, a flow of oil when the first opened state is formed in the damping force changing section 60 will be described.

As shown in FIG. 5B, in the first opened state, a state exists where the protruding section 642 of the shutter valve 64 has separated from the opposing section 472 of the bolt 47 and the throttle section 60V has opened. In other words, in the hydraulic damping device 1, a flow of oil via the bypass oil channel 471 is enabled.

(During Compression Stroke/First Opened State)

When the piston constituting section 30 moves to the one side in the axial direction with respect to the cylinder 11, as indicated by a solid line arrow in FIG. 5B, oil in the first oil chamber Y1 flows into the compression side oil channel 416 and flows out to the compression side inter-valve chamber 42Y while pressing and opening the compression side first valve 42. Subsequently, the oil in the compression side inter-valve chamber 42Y flows through the opening 491, the bypass oil channel 471, the adjustment chamber 60Y, the throttle section 60V, the opening 473R, the housing inner chamber 31Y, and the opening 313 and flows out to the second oil chamber Y2. In this manner, in the first opened state, oil flows so as to bypass the flow of oil which presses and opens the compression side second valve 43.

As described above, during a compression stroke in the first opened state, a damping force is mainly generated by resistance created when oil flows through the compression side oil channel 416 and the compression side first valve 42. In addition, the damping force generated in the first opened state is smaller than the damping force generated in the closed state.

(During Extension Stroke/First Opened State)

As indicated by a dashed line arrow in FIG. 5B, when the piston constituting section 30 moves to the other side in the axial direction with respect to the cylinder 11, oil in the second oil chamber Y2 flows through the opening 313, the housing inner chamber 31Y, the opening 473R, the throttle section 60V, the adjustment chamber 60Y, and the bypass oil channel 471 in this order. In addition, the oil in the bypass oil channel 471 flows into the extension side second oil channel 418 and flows out to the first oil chamber Y1 while pressing and opening the extension side second valve 45. In this manner, in the first opened state, oil flows so as to bypass the flow of oil which presses and opens the extension side first valve 44.

As described above, during an extension stroke in the first opened state, a damping force is mainly generated by resistance created when oil flows through the extension side second oil channel 418 and the extension side second valve 45. In addition, the damping force generated in the first opened state is smaller than the damping force generated in the closed state.

Furthermore, as described above, the bypass oil channel 471 forms both a flow that bypasses the compression side second valve 43 during a compression stroke and a flow that bypasses the extension side first valve 44 during an extension stroke. Accordingly, a device configuration of the hydraulic damping device 1 is simplified.

(During Compression Stroke and During Extension Stroke/Second Opened State)

Next, a flow of oil when the second opened state (a state where the guided section 641 is fitted into the third depressed section 633) is formed in the damping force changing section 60 will be described.

In this case, a flow of oil in the second opened state is similar to that in the first opened state (a state where the guided section 641 is fitted into the second depressed section 632). However, in the second opened state, a throttle amount of the throttle section 60V in the damping force changing section 60 is smaller as compared to the first opened state. Therefore, the damping force generated in the second opened state is smaller than the damping forces generated in the closed state and the first opened state.

As described above, with the hydraulic damping device 1 according to the first embodiment, by adjusting a flow of oil in the bypass oil channel 471 using the damping force changing section 60, a magnitude of a generated damping force can be changed. In addition, in the first embodiment, the throttle section 60V which throttles the flow of oil in the bypass oil channel 471 is formed further on the outer side than the valves (the compression side first valve 42, the compression side second valve 43, the extension side first valve 44, and the extension side second valve 45) with respect to the valve seat 41. Accordingly, for example, compared to a case where the throttle section 60V is formed on the inner side of the valves with respect to the valve seat 41, machining when manufacturing the hydraulic damping device 1 can be easily performed.

In addition, in the first embodiment, flows of oil through the bypass oil channel 471 are switched using the damping force changing section 60 that operates under electric control. Furthermore, by switching the flows of oil through the bypass oil channel 471, for example, one of or both the compression side first valve 42 and the compression side second valve 43 are opened by the flow of oil. In this manner, in the first embodiment, instead of directly operating the compression side first valve 42 and the compression side second valve 43 by electric control, the compression side first valve 42 and the compression side second valve 43 are indirectly controlled by switching flows of oil in the bypass oil channel 471 by electric control.

Moreover, while the oil throttle amounts adjusted at the throttle section 60V of the damping force changing section 60 are set to three stages, namely, the closed state, the first opened state, and the second opened state in the first embodiment, a plurality of stages may be further provided for the opened state.

In other words, the oil throttle amounts to be adjusted at the throttle section 60V may be set to the two stages of the closed state and the first opened state. In addition, the oil throttle amounts to be adjusted at the throttle section 60V may be set to stages of a third opened state and more in addition to the first opened state and the second opened state according to the embodiment described above.

Furthermore, in the first embodiment, the piston section 40 (the valve seat 41, the compression side first valve 42, the compression side second valve 43, the extension side first valve 44, and the extension side second valve 45) is provided inside the housing 31. Therefore, in the piston constituting section 30, the piston section 40 can be readily replaced with a piston section of another type. On the other hand, the housing 31 and the damping force changing section 60 can be commonly used in the piston constituting section 30.

First Modification

Next, the hydraulic damping device 1 according to a first modification will be described.

Figure 6:
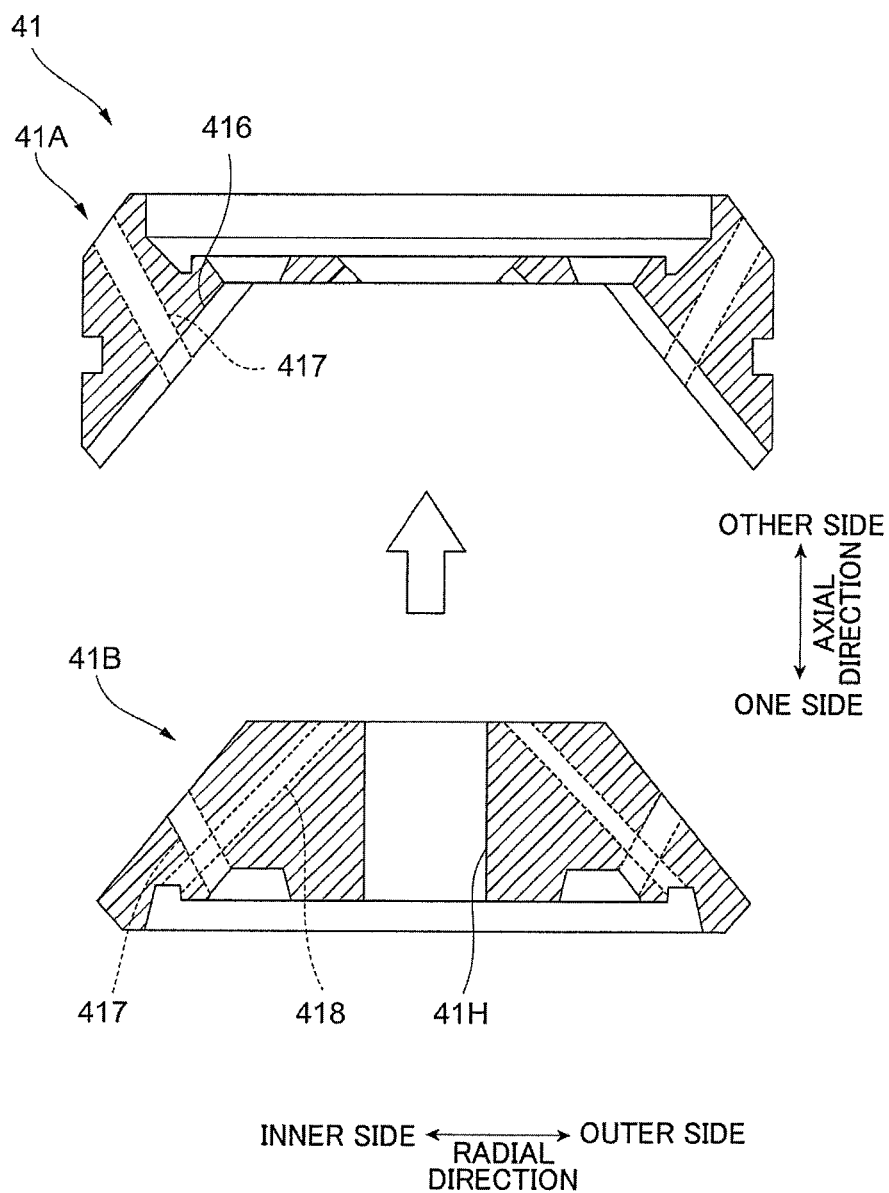
FIG. 6 is an explanatory diagram of a valve seat to which a first modification is applied.

FIG. 6 is an explanatory diagram of the valve seat 41 to which the first modification is applied.

In the hydraulic damping device 1 according to the first modification, a structure of the valve seat 41 differs from that of the valve seat 41 according to the first embodiment. Specifically, as shown in FIG. 6, the valve seat 41 according to the first modification has a split structure which includes a first structure section 41A and a second structure section 41B.

The first structure section 41A is a portion which is provided on the other side in FIG. 6 and the second structure section 41B is a portion which is provided on the one side in FIG. 6. In addition, in the first modification, the first structure section 41A and the second structure section 41B are joined together to integrally constitute the valve seat 41.

In the first structure section 41A, other side-parts of the compression side oil channel 416 and the extension side first oil channel 417 are formed. The compression side oil channel 416 is formed in a groove shape. In addition, the compression side oil channel 416 is configured to constitute an oil channel when the first structure section 41A and the second structure section 41B are joined together. Furthermore, the extension side first oil channel 417 is formed as a through-hole.

In the second structure section 41B, one side-parts of the extension side second oil channel 418 and the extension side first oil channel 417 are formed. The extension side first oil channel 417 and the extension side second oil channel 418 of the second structure section 41B are formed as through-holes. In addition, the extension side first oil channel 417 of the second structure section 41B is configured to constitute a single oil channel by connecting to the extension side first oil channel 417 of the first structure section 41A when the first structure section 41A and the second structure section 41B are joined together.

Moreover, although not illustrated, the first structure section 41A and the second structure section 41B respectively include positioning sections in the circumferential direction such as protrusions and depressions. The positioning sections determine a relative positional relationship between the first structure section 41A and the second structure section 41B in the circumferential direction.

With the valve seat 41 according to the first modification configured as described above, for example, the compression side oil channel 416 can be formed by a protrusion strip section having been formed in a mold. Therefore, for example, the time required by machining such as cutting can be reduced and, as a result, the hydraulic damping device 1 can be machined more easily. In addition, for example, due to the split configuration of the first structure section 41A and the second structure section 41B, the hydraulic damping device 1 can be machined more easily as exemplified by an increased degree of freedom of penetration angles of tools when cutting the extension side first oil channel 417 and the extension side second oil channel 418 as through-holes.

Moreover, the valve seat 41 is not limited to the two-way split described above and a configuration may be adopted in which the valve seat 41 is split three ways or more.

Second Modification

Next, the hydraulic damping device 1 according to a second modification will be described.

Figure 7:
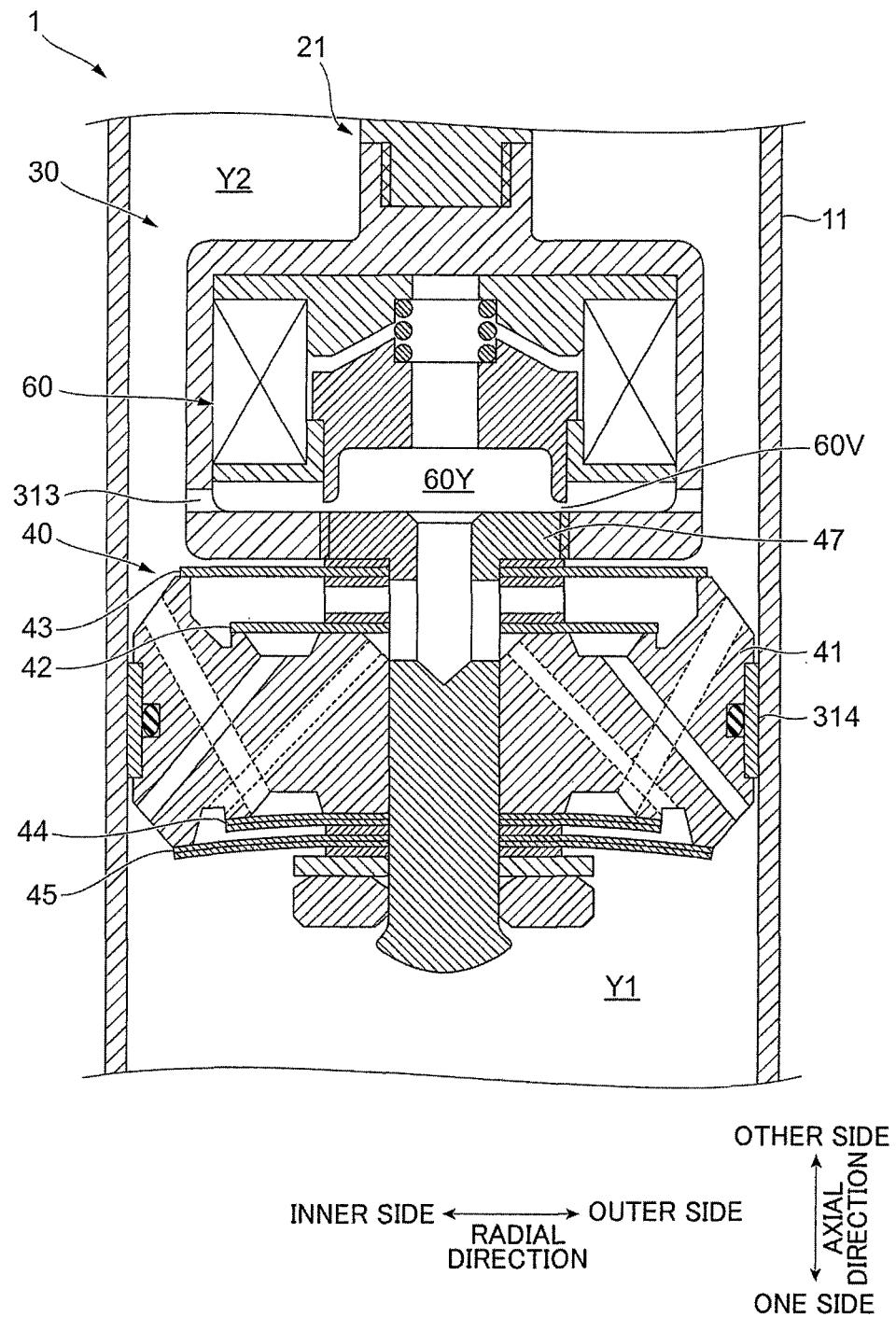
FIG. 7 is an explanatory diagram of a piston constituting section according to a second modification.

FIG. 7 is an explanatory diagram of the piston constituting section 30 according to the second modification.

As shown in FIG. 7, the piston constituting section 30 according to the second modification includes the piston section 40 and the damping force changing section 60 which is provided between the piston section 40 and the rod member 21. In other words, the piston constituting section 30 according to the second modification does not include the housing 31.

Even with a structure not provided with the housing 31 as in the case of the second modification, by arranging the throttle section 60V further on the outer side (the other side in the axial direction) than the valves (the compression side first valve 42, the compression side second valve 43, the extension side first valve 44, and the extension side second valve 45) with respect to the valve seat 41, the hydraulic damping device 1 can be machined more easily.

Second Embodiment

Figure 8:
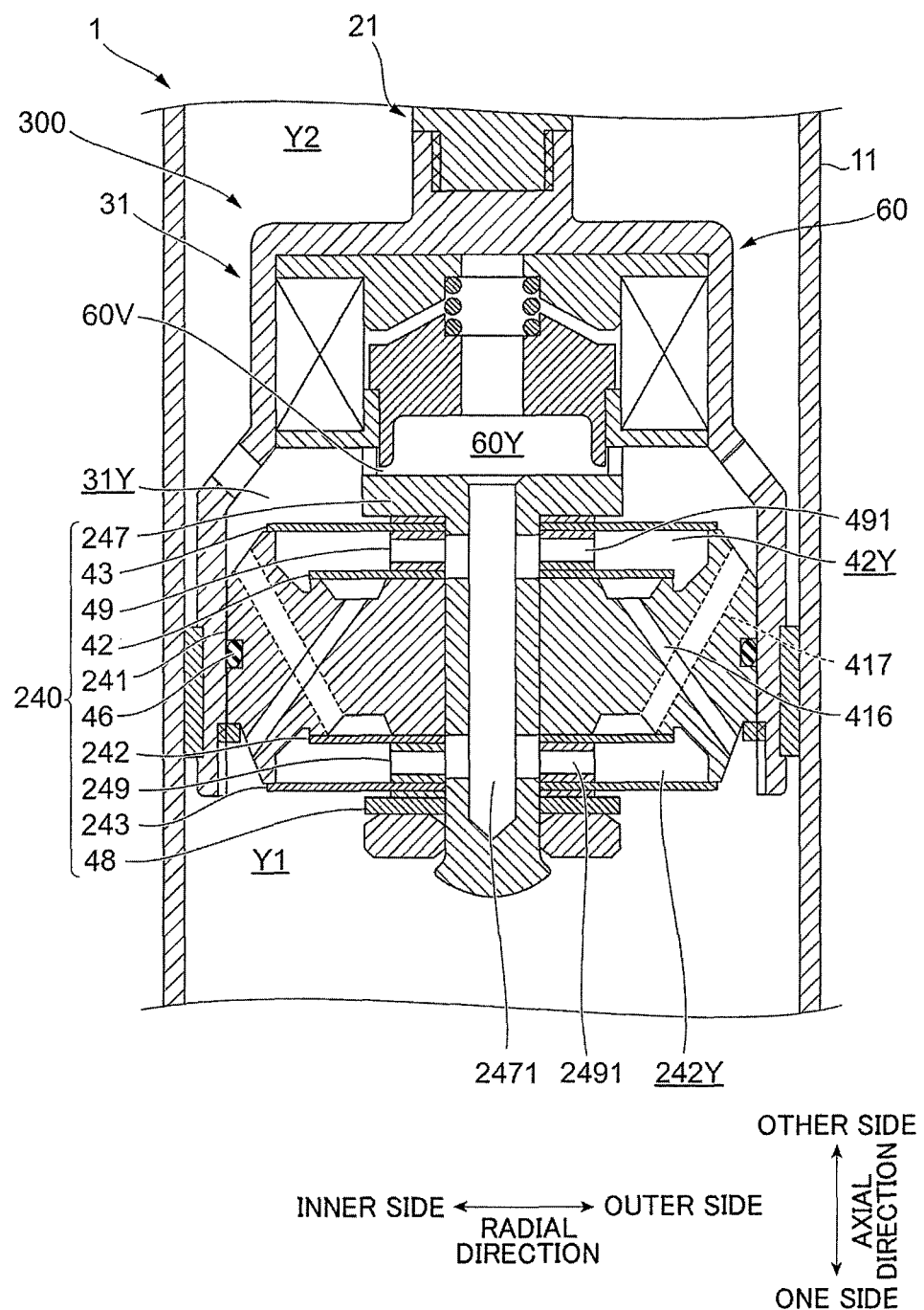
FIG. 8 is a sectional view showing a piston constituting section according to a second embodiment.

FIG. 8 is a sectional view of a piston constituting section 300 according to a second embodiment.

Moreover, in the second embodiment, members similar to those of the first embodiment will be assigned same numbers and detailed descriptions thereof will be omitted.

[Configuration and Function of Piston Constituting Section 300]

The piston constituting section 300 includes a housing 31, a piston section 240 which is provided on an inner side of the housing 31 in the radial direction, and a damping force changing section 60 which is provided on the other side of the piston section 240.

Next, a general configuration of the hydraulic damping device 1 according to the second embodiment will be described.

As shown in FIG. 8, the hydraulic damping device 1 includes: a cylinder 11 which extends from one side toward another side and which houses oil (a fluid); a housing 31 (a partitioning section) which is provided so as to be movable in an axial direction in the cylinder 11 and which partitions a space in the cylinder 11 into a first oil chamber Y1 (a first chamber) and a second oil chamber Y2 (a second chamber); a valve seat 241 (a flow channel formation section) in which a compression side oil channel 416 (a flow channel) through which the oil flows is formed in conjunction with a movement of the housing 31; a compression side second valve 43 (a valve section) which controls a flow of the oil in the compression side oil channel 416 of the valve seat 241; a bypass oil channel 2471 (a bypass channel) which forms a flow of the oil that bypasses the flow of the oil flowing through the compression side oil channel 416 while opening the compression side second valve 43; and a throttle section 60V which throttles the flow of the oil through the bypass oil channel 2471 further on the outer side (more specifically, the other side in the axial direction) than the compression side second valve 43 with respect to the valve seat 241. Hereinafter, these components will be described in detail.

In the piston constituting section 300 according to the second embodiment, a configuration of the piston section 240 differs from that of the piston section 40 according to the first embodiment. Hereinafter, the piston section 240 will be described in detail.

A basic configuration of the piston section 240 according to the second embodiment is similar to that of the piston section 40 according to the first embodiment. However, the piston section 240 mainly differs from the first embodiment in configurations of a bolt 247, a valve seat 241, an extension side first valve 242, an extension side inter-valve member 249, and an extension side second valve 243.

The valve seat 241 includes the compression side oil channel 416 and an extension side first oil channel 417 but does not include the extension side second oil channel 418 according to the first embodiment.

Basic configurations of the extension side first valve 242 and the extension side second valve 243 are respectively approximately similar to those of the compression side first valve 42 and the compression side second valve 43 with the exception of being provided on the one side of the valve seat 241. In addition, in the second embodiment, an extension side inter-valve chamber 242Y into which oil flows is formed between the extension side first valve 242 and the extension side second valve 243.

The extension side inter-valve member 249 includes an extension side opening 2491 that penetrates the extension side inter-valve member 249 in the radial direction.

The bolt 247 includes a bypass oil channel 2471. The bypass oil channel 2471 penetrates the bolt 247 in the radial direction in a part of the bolt 247 but does not penetrate the bolt 247 in the axial direction. In addition, the bypass oil channel 2471 communicates with the extension side opening 2491 of the extension side inter-valve member 249 on the one side in the axial direction and communicates with the opening 491 of the compression side inter-valve member 49 on the other side.

Operations of Hydraulic Damping Device 1 According to Second Embodiment

Figure 9:
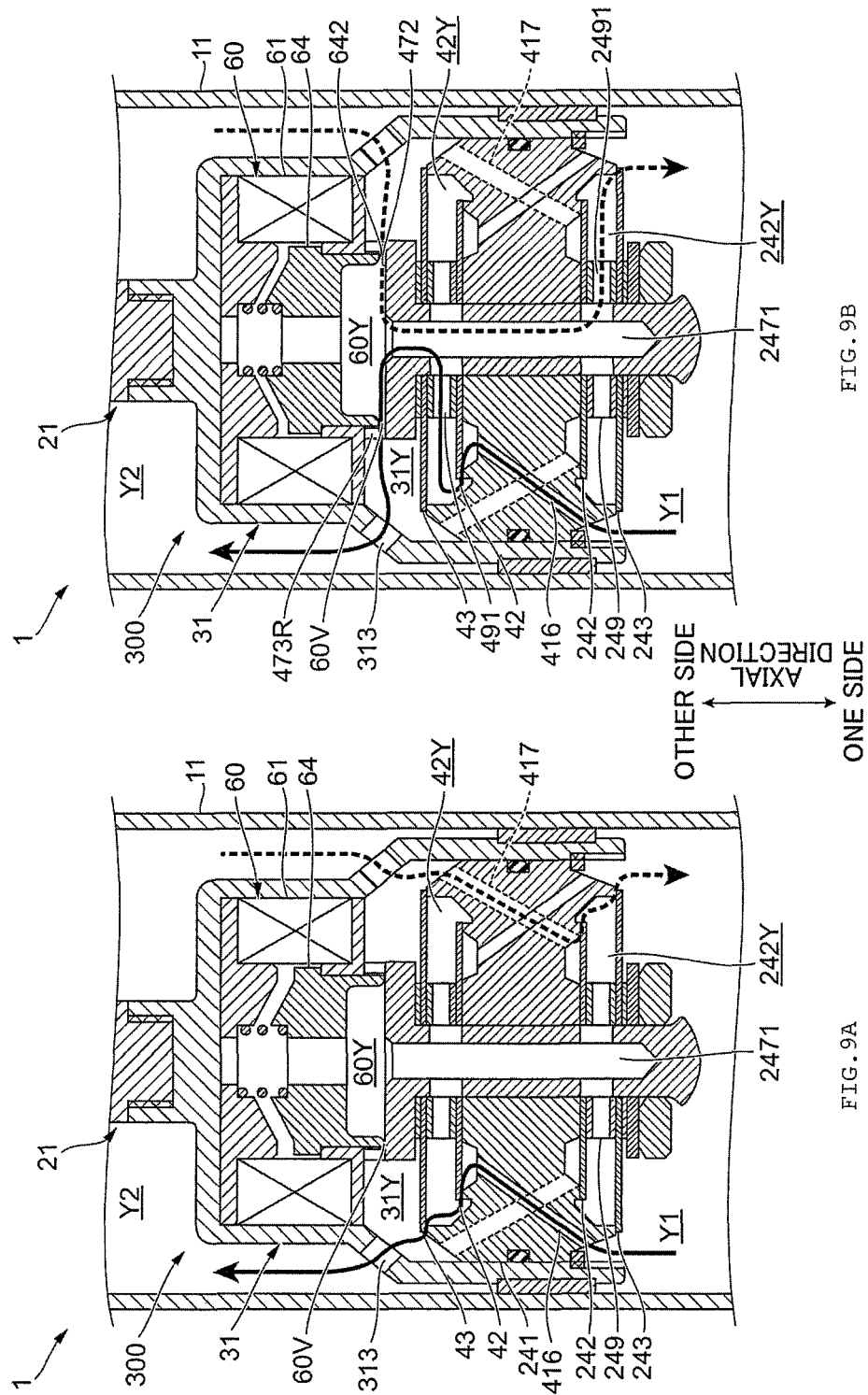
FIGS. 9A and 9B are explanatory diagrams of operations of a hydraulic damping device according to the second embodiment.

FIGS. 9A and 9B are explanatory diagrams of operations of the hydraulic damping device 1 according to the second embodiment.

Moreover, in FIGS. 9A and 9B, a flow of oil during a compression stroke will be depicted by a solid line and a flow of oil during an extension stroke will be depicted by a dashed line. In addition, FIG. 9A is a diagram showing a case where a closed state is formed in the damping force changing section 60. FIG. 9B is a diagram showing a case where a first opened state is formed in the damping force changing section 60.

First, a flow of oil when the closed state is formed in the damping force changing section 60 will be described. In addition, hereinafter, descriptions applicable during a compression stroke and during an extension stroke will be respectively given in this order.
(During Compression Stroke/Closed State)

As indicated by a solid line arrow in FIG. 9A, a flow of oil in the piston constituting section 300 during a compression stroke is similar to the flow of oil in the piston constituting section 30 according to the first embodiment.
(During Extension Stroke/Closed State)

As indicated by a dashed line arrow in FIG. 9A, when the piston constituting section 30 moves to the other side in the axial direction with respect to the cylinder 11, oil in the second oil chamber Y2 flows through the opening 313, the housing inner chamber 31Y, and the extension side first oil channel 417 and flows out to the extension side inter-valve chamber 242Y while pressing and opening the extension side first valve 242. Furthermore, the oil having flowed out to the extension side inter-valve chamber 242Y flows out to the first oil chamber Y1 while pressing and opening the extension side second valve 243.

As described above, during an extension stroke in the closed state, a damping force is mainly generated by resistance created when oil flows through the extension side first oil channel 417, the extension side first valve 242, and the extension side second valve 243.

Next, a flow of oil when the first opened state is formed in the damping force changing section 60 will be described.

As shown in FIG. 9B, in the first opened state, a state exists where the protruding section 642 of the shutter valve 64 has separated from the opposing section 472 and the throttle section 60V has opened. In other words, in the hydraulic damping device 1, a flow of oil via the bypass oil channel 2471 is enabled.
(During Compression Stroke/First Opened State)

As indicated by a solid line arrow in FIG. 9B, a flow of oil in the piston constituting section 300 in the first opened state during a compression stroke is similar to the flow of oil in the piston constituting section 30 according to the first embodiment.
(During Extension Stroke/First Opened State)

As indicated by a dashed line arrow in FIG. 9B, when the piston constituting section 300 moves to the other side in the axial direction with respect to the cylinder 11, oil in the second oil chamber Y2 flows through the opening 313, the housing inner chamber 31Y, the opening 473R, the throttle section 60V, the adjustment chamber 60Y, and the bypass oil channel 2471 in this order. In addition, the oil in the bypass oil channel 2471 flows into the extension side opening 2491 and flows out to the first oil chamber Y1 while pressing and opening the extension side second valve 243. In this manner, in the first opened state, oil flows so as to bypass the flow of oil which presses and opens the extension side first valve 242.

As described above, during an extension stroke in the first opened state, a damping force is mainly generated by resistance created when oil flows through the extension side second valve 243. In addition, the damping force generated in the first opened state is smaller than the damping force generated in the closed state.
(During Compression Stroke and During Extension Stroke/ Second Opened State)

Next, a flow of oil when the second opened state is formed in the damping force changing section 60 will be described.

In this case, a flow of oil in the second opened state is approximately similar to that in the first opened state. However, in the second opened state, a throttle amount of the throttle section 60V in the damping force changing section 60 is smaller as compared to the first opened state. Therefore, the damping force generated in the second opened state is smaller than the damping forces generated in the closed state and the first opened state.

As described above, with the hydraulic damping device 1 according to the second embodiment, by adjusting a flow of oil in the bypass oil channel 2471 using the damping force changing section 60, a magnitude of a generated damping force can be changed. In addition, in the second embodiment, the throttle section 60V which throttles the flow of oil in the bypass oil channel 2471 is formed further on the outer side than the valves (the compression side first valve 42, the compression side second valve 43, the extension side first valve 242, and the extension side second valve 243) with respect to the valve seat 241. Accordingly, for example, compared to a case where the throttle section 60V is formed on the inner side of the valves with respect to the valve seat 241, machining when manufacturing the hydraulic damping device 1 can be readily performed.

Third Embodiment

Figure 10:
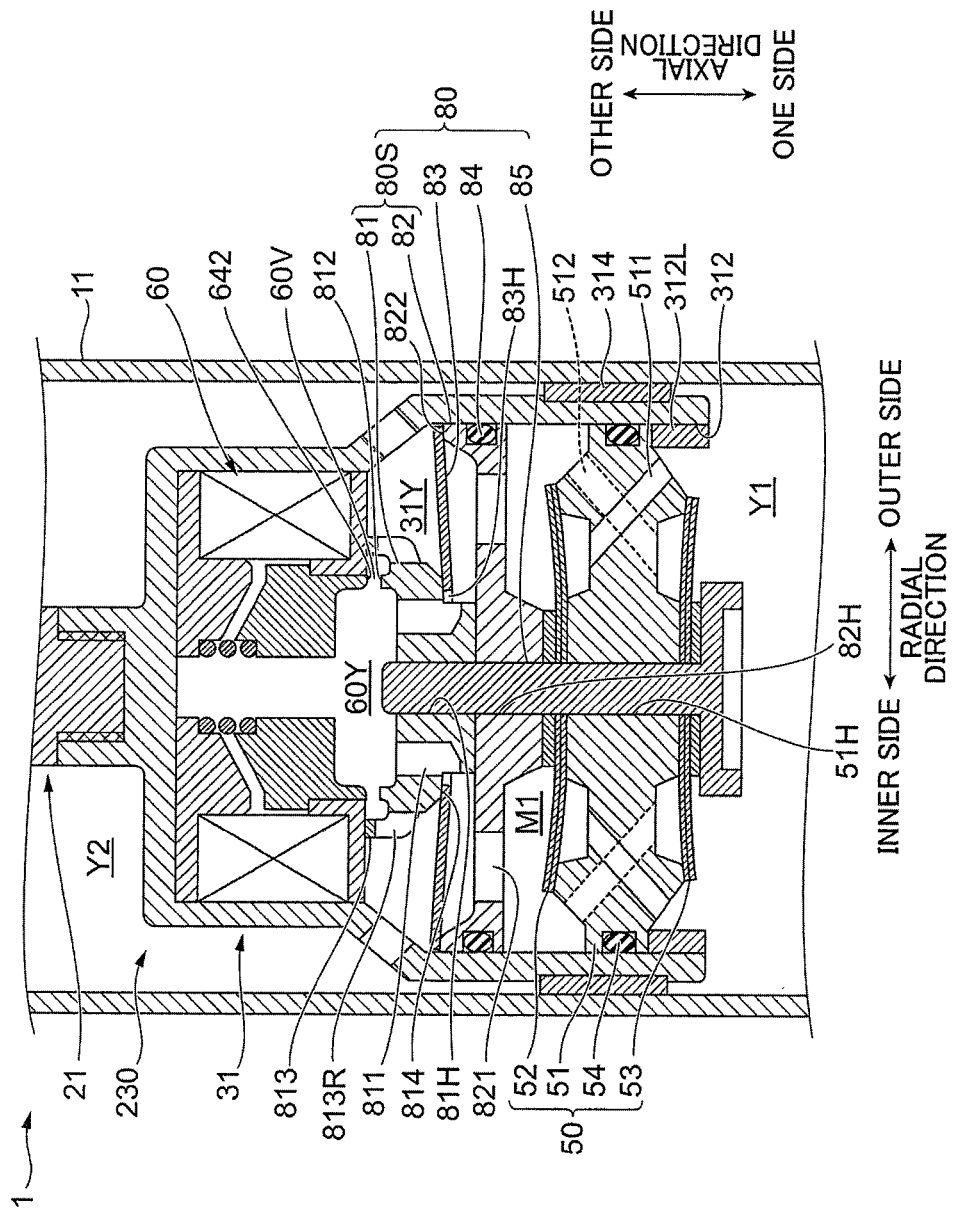
FIG. 10 is a sectional view showing a piston constituting section according to a third embodiment.

FIG. 10 is a sectional view of a piston constituting section 230 according to a third embodiment.

Moreover, in the third embodiment, members similar to those of the first embodiment will be assigned same numbers and detailed descriptions thereof will be omitted.
[Configuration and Function of Piston Constituting Section 230]

The piston constituting section 230 includes a housing 31, a first piston section 80 which is provided on the inner side of the housing 31 in the radial direction, a second piston section 50 which is provided on the inner side of the housing 31 in the radial direction which is also the one side of the first piston section 80, and a damping force changing section 60 which is provided on the inner side of the housing 31 which is also the other side of the first piston section 80.

Moreover, in the third embodiment, an intermediate oil chamber M1 into which oil flows is formed between the first piston section 80 and the second piston section 50.

Next, a general configuration of the hydraulic damping device 1 according to the third embodiment will be described.

As shown in FIG. 10, the hydraulic damping device 1 includes: a cylinder 11 which extends from one side toward another side and which houses oil (a fluid); a housing 31 (a partitioning section) which is provided so as to be movable in an axial direction in the cylinder 11 and which partitions a space in the cylinder 11 into a first oil chamber Y1 (a first chamber) and a second oil chamber Y2 (a second chamber); a first valve seat 80S (a flow channel formation section) in which a flow channel through which the oil flows is formed in conjunction with a movement of the housing 31; a damping valve 83 (a valve section) which controls a flow of the oil in the oil channel of the first valve seat 80S; a bypass oil channel 811 (a bypass channel) which forms a flow of the oil that bypasses the flow of the oil flowing through the oil channel while opening the damping valve 83; and a throttle section 60V which throttles the flow of the oil through the bypass oil channel 811 further on the outer side than the damping valve 83 with respect to the first valve seat 80S. Hereinafter, these components will be described in detail.

[First Piston Section 80]

As shown in FIG. 10, the first piston section 80 includes the first valve seat 80S. In addition, the first valve seat 80S includes an extension side valve seat 81 which is provided on the other side and a compression side valve seat 82 which is provided on the one side of the extension side valve seat 81. Furthermore, the first piston section 80 includes the damping valve 83 which is provided between the extension side valve seat 81 and the compression side valve seat 82, a first seal member 84 which is provided on an outer circumference of the compression side valve seat 82, and a bolt 85.

(Extension Side Valve Seat 81)

The extension side valve seat 81 is an approximately columnar member which includes an opening 81H through which the bolt 85 is passed. In addition, the extension side valve seat 81 includes a plurality of the bypass oil channels 811 which are formed so as to extend in the axial direction, an opposing section 812 formed on the other side, a connecting section 813 formed on the other side and further on the outer side in the radial direction than the opposing section 812, and an extension side contacting section 814 formed on the inner side in the radial direction.

The bypass oil channels 811 form a pathway of oil that bypasses a flow of oil which flows as the damping valve 83 deforms in a direction of separation from the extension side contacting section 814 or a compression side contacting section 822 (to be described later) of the compression side valve seat 82.

The opposing section 812 is formed at a position that opposes a protruding section 642 of the damping force changing section 60. In addition, in the third embodiment, the opposing section 812 forms the throttle section 60V between the protruding section 642 and the opposing section 812.

The connecting section 813 comes into contact with a second cam housing 63. In addition, the connecting section 813 forms a connection location with the damping force changing section 60. Furthermore, the connecting section 813 includes a plurality of openings 813R.

The extension side contacting section 814 is a ring-shaped surface which is formed by steps and which faces the one side. In addition, the extension side contacting section 814 forms a portion which is on the inner side of the damping valve 83 in the radial direction and with which the other side of the damping valve 83 comes into contact.

(Compression Side Valve Seat 82)

The compression side valve seat 82 is an approximately disc-shaped member which includes an opening 82H through which the bolt 85 is passed. In addition, the compression side valve seat 82 includes an opening 821 formed on the outer side of the opening 82H in the radial direction and the compression side contacting section 822 which is formed further on the outer side in the radial direction than the opening 821.

The opening 821 is formed so as to penetrate in the axial direction. In the third embodiment, the opening 821 is provided in plurality in the circumferential direction of the compression side valve seat 82.

The compression side contacting section 822 annularly protrudes toward the other side. In addition, the compression side contacting section 822 forms a portion which is on the outer side of the damping valve 83 in the radial direction and with which the one side of the damping valve 83 comes into contact.

Furthermore, in the first valve seat 80S according to the third embodiment, a flow channel through which oil flows in conjunction with a movement of the piston constituting section 230 in the axial direction is formed between the extension side contacting section 814 and the compression side contacting section 822.

(Damping Valve 83)

The damping valve 83 is constituted by a disc-shaped metal plate material which includes an opening 83H through which the extension side contacting section 814 is passed. In addition, by deforming, the damping valve 83 forms a state where oil flows while the damping valve 83 is separated from the extension side contacting section 814 of the extension side valve seat 81 and a state where oil flows while the damping valve 83 is separated from the compression side contacting section 822 of the compression side valve seat 82. In other words, the damping valve 83 is configured to control a flow (a first flow) of oil in conjunction with a movement of the piston constituting section 230 toward the one side during a compression stroke and a flow (a second flow) of oil in conjunction with a movement of the piston constituting section 230 toward the other side during an extension stroke by a single member (a single body). Furthermore, in the third embodiment, the damping valve 83 is arranged on a side where the throttle section 60V of the first valve seat 80S is provided.

The first seal member 84 provides a seal between the compression side valve seat 82 and the housing 31.

The bolt 85 is connected to a female screw formed on an inner circumference of the opening 81H of the extension side valve seat 81. In addition, the bolt 85 holds various parts of the first piston section 80 and the second piston section 50 which are sandwiched between the extension side valve seat 81 and a one side-end of the bolt 85.

[Second Piston Section 50]

As shown in FIG. 10, the second piston section 50 includes a second valve seat 51, a second compression side damping valve 52 which is provided on the other side of the second valve seat 51, a second extension side damping valve 53 which is provided on a one side-end of the second valve seat 51, and a second seal member 54 which is provided on the outer side in the radial direction of the second valve seat 51.

The second valve seat 51 includes a plurality of second compression side oil channels 511 formed in an approximately axial direction on the outer side in the radial direction and a plurality of second extension side oil channels 512 formed in an approximately axial direction on the outer side in the radial direction.

The second compression side damping valve 52 is constituted by a disc-shaped metal plate material. In addition, the second compression side damping valve 52 makes the other side of the second compression side oil channels 511 of the second valve seat 51 to be openable and closable and always opens the other side of the second extension side oil channels 512 of the second valve seat 51.

The second extension side damping valve 53 is constituted by a disc-shaped metal plate material. In addition, the second extension side damping valve 53 makes the one side of the second extension side oil channels 512 of the second valve seat 51 to be openable and closable and always opens the one side of the second compression side oil channels 511 of the second valve seat 51.

Operations of Hydraulic Damping Device 1 According to Third Embodiment

Figure 11:
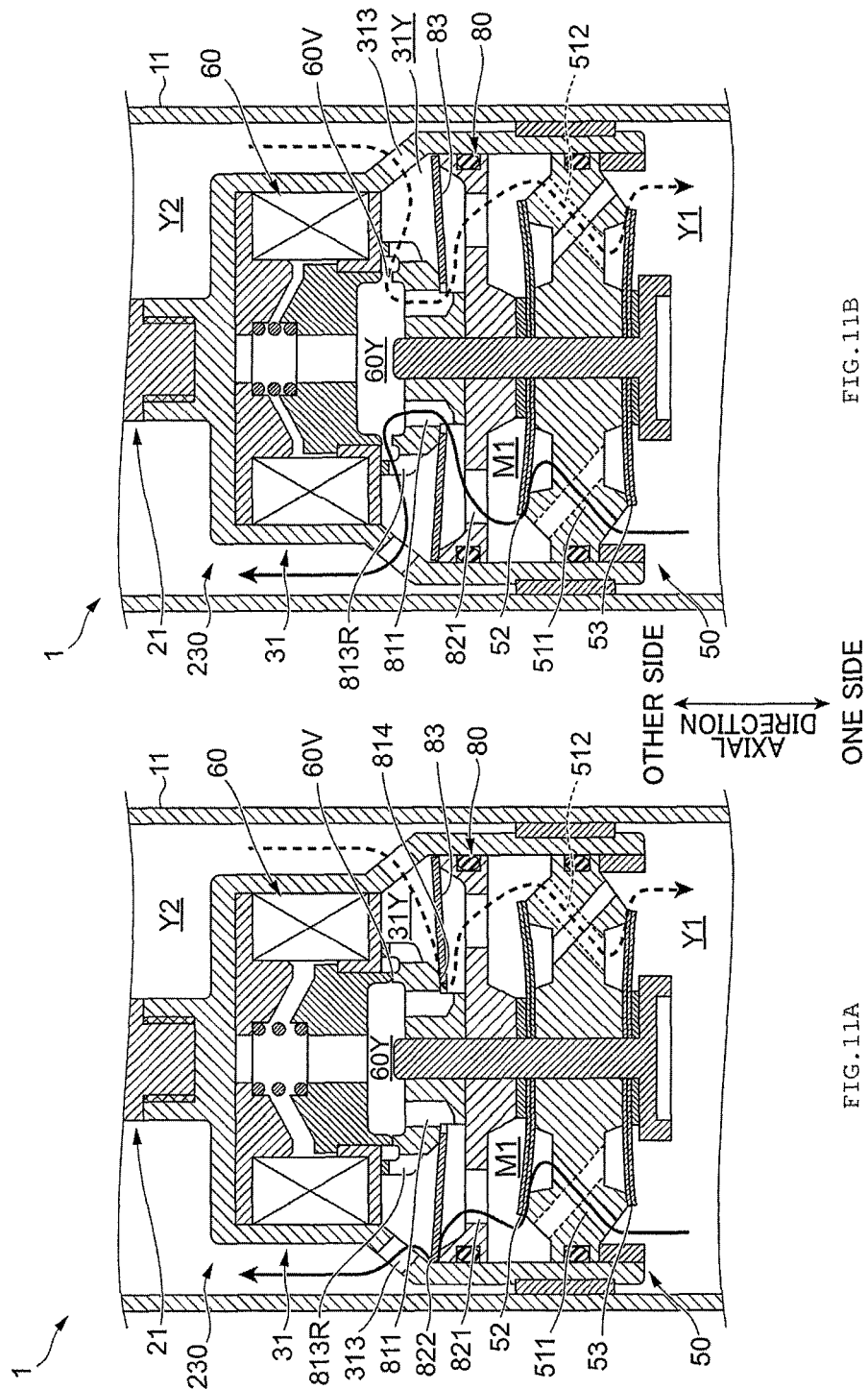
FIGS. 11A and 11B are explanatory diagrams of operations of a hydraulic damping device according to the third embodiment.

FIGS. 11A and 11B are explanatory diagrams of operations of the hydraulic damping device 1 according to the third embodiment.

Moreover, in FIGS. 11A and 11B, a flow of oil during a compression stroke will be depicted by a solid line and a flow of oil during an extension stroke will be depicted by a dashed line. In addition, FIG. 11A is a diagram showing a case where a closed state is formed in the damping force changing section 60. FIG. 11B is a diagram showing a case where a first opened state is formed in the damping force changing section 60.

First, a flow of oil when the closed state is formed in the damping force changing section 60 will be described. In addition, hereinafter, descriptions applicable during a compression stroke and during an extension stroke will be respectively given in this order.

(During Compression Stroke/Closed State)

When the piston constituting section 230 moves to the one side in the axial direction with respect to the cylinder 11, as indicated by a solid line arrow in FIG. 11A, oil in the first oil chamber Y1 flows into the second compression side oil channels 511 and flows out to the intermediate oil chamber M1 while pressing and opening the second compression side damping valve 52. Furthermore, the oil having flowed out to the intermediate oil chamber M1 passes through the opening 821 and, while pressing and opening the compression side valve seat 82 at the compression side contacting section 822, flows through the housing inner chamber 31Y and the opening 313 and flows out to the second oil chamber Y2.

As described above, during a compression stroke in the closed state, a damping force is mainly generated by resistance created when oil flows through the second compression side oil channels 511 and between the second compression side damping valve 52 and the compression side valve seat 82.

Moreover, in the closed state, the throttle section 60V is in a closed state in the damping force changing section 60. Therefore, in the closed state, a flow of oil via the bypass oil channel 811 such as that described later is not formed.

(During Extension Stroke/Closed State)

When the piston constituting section 230 moves to the other side in the axial direction with respect to the cylinder 11, as indicated by a dashed line arrow in FIG. 11A, oil in the second oil chamber Y2 flows through the opening 313 and the housing inner chamber 31Y and flows out to the intermediate oil chamber M1 through the opening 821 while pressing and opening the damping valve 83 at the extension side contacting section 814. In addition, the oil having flowed out to the intermediate oil chamber M1 flows into the second extension side oil channels 512. Furthermore, the oil having flowed into the second extension side oil channels 512 flows out to the first oil chamber Y1 while opening the second extension side damping valve 53.

As described above, during an extension stroke in the closed state, a damping force is mainly generated by resistance created when oil flows through the damping valve 83, the second extension side oil channels 512, and the second extension side damping valve 53.

As described above, when a closed state is formed in the damping force changing section 60, damping forces are generated in both the first piston section 80 and the second piston section 50.

Next, a flow of oil when the first opened state is formed in the damping force changing section 60 will be described.

As shown in FIG. 11B, in the first opened state, a state exists where the throttle section 60V has opened. Therefore, in the first opened state, oil flows so as to bypass the pathway through which oil flows while pressing and opening the damping valve 83. Moreover, in this case, the flow of oil in the second piston section 50 is the same as in the case of the closed state described above. Therefore, a flow of oil in the first piston section 80 in the first opened state will be mainly described below.

(During Compression Stroke/First Opened State)

As indicated by a solid line arrow in FIG. 11B, when the piston constituting section 230 moves to the one side in the axial direction with respect to the cylinder 11, a flow of oil in the second piston section 50 is created. In addition, the oil flows out from the first oil chamber Y1 to the intermediate oil chamber M1. Furthermore, the oil having flowed out to the intermediate oil chamber M1 flows through the opening 821 and the bypass oil channel 811 to the adjustment chamber 60Y. Moreover, the oil having flowed to the adjustment chamber 60Y passes through the throttle section 60V, the opening 813R, the housing inner chamber 31Y, and the opening 313 and flows out to the second oil chamber Y2.

As described above, during a compression stroke in the first opened state, a damping force is mainly generated by resistance created when oil flows through the second compression side oil channels 511 and the second compression side damping valve 52 in the second piston section 50 described above. In addition, a certain damping force is also generated in the damping force changing section 60 when oil flows through the throttle section 60V.

(During Extension Stroke/First Opened State)

As indicated by a dashed line arrow in FIG. 11B, when the piston constituting section 230 moves to the other side in the axial direction with respect to the cylinder 11, oil in the second oil chamber Y2 flows through the opening 313, the housing inner chamber 31Y, the opening 813R, and the throttle section 60V and flows into the adjustment chamber 60Y. In addition, the oil in the adjustment chamber 60Y flows through the bypass oil channel 811 and the opening 821 and flows out to the intermediate oil chamber M1.

Furthermore, the oil in the intermediate oil chamber M1 causes a flow of oil in the second piston section 50. Moreover, eventually, the oil in the intermediate oil chamber M1 flows out to the first oil chamber Y1.

As described above, during an extension stroke in the first opened state, a damping force is mainly generated by resistance created when oil flows through the second extension side oil channels 512 and the second extension side damping valve 53 in the second piston section 50 described above. In addition, a certain damping force is also generated in the damping force changing section 60 when oil flows through the throttle section 60V.

In the closed state described above, oil serially flows through both the first piston section 80 and the second piston section 50. In contrast, in the first opened state, oil mainly flows through the second piston section 50. Therefore, the damping force generated in the first opened state is smaller than the damping force generated in the closed state.

In addition, as described above, the bypass oil channel 811 forms both a flow that bypasses the damping valve 83 during a compression stroke and a flow that bypasses the damping valve 83 during an extension stroke. Accordingly, with the third embodiment, a device configuration of the hydraulic damping device 1 is simplified.

Moreover, a flow of oil in the second opened state is approximately similar to that in the first opened state described above. However, the damping force in the second opened state is smaller than the damping forces generated in the closed state and the first opened state.

As described above, even with the hydraulic damping device 1 according to the third embodiment, a magnitude of a generated damping force can be changed using the damping force changing section 60. In addition, in the third embodiment, the throttle section 60V is similarly formed further on the outer side than the valve (the damping valve 83) with respect to the first valve seat 80S. Accordingly, machining when manufacturing the hydraulic damping device 1 is simplified.

Fourth Embodiment

Figure 12:
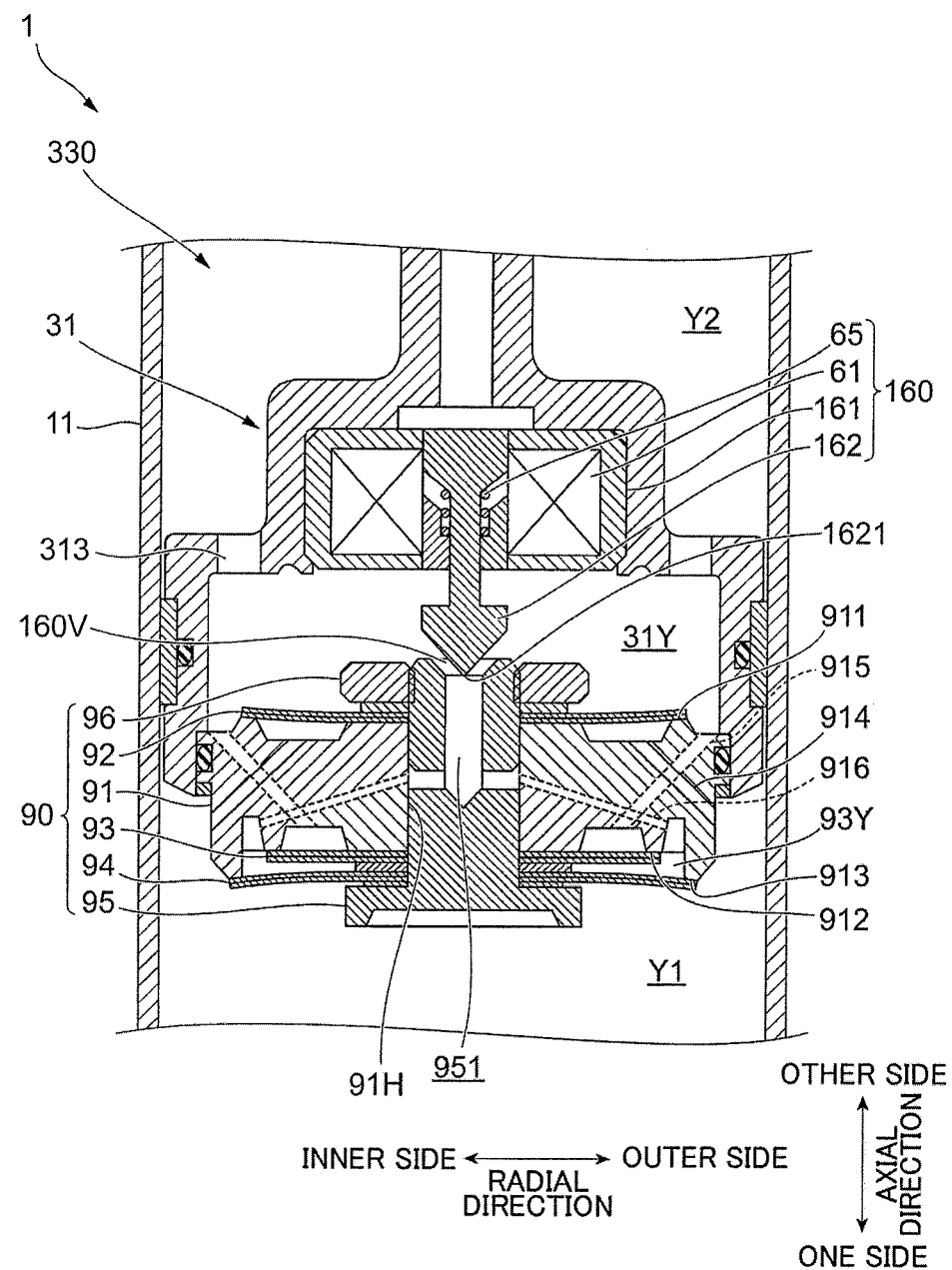
FIG. 12 is a sectional view showing a piston constituting section according to a fourth embodiment.

FIG. 12 is a sectional view of a piston constituting section 330 according to a fourth embodiment.

Moreover, in the fourth embodiment, members similar to those of the other embodiments will be assigned same numbers and detailed descriptions thereof will be omitted.
[Configuration and Function of piston Constituting Section 330]

As shown in FIG. 12, the piston constituting section 330 according to the fourth embodiment includes a housing 31, a third piston section 90 which is provided on an inner side of the housing 31 in the radial direction, and a damping force changing section 160 which is provided on the other side of the third piston section 90.

Next, a general configuration of the hydraulic damping device 1 according to the fourth embodiment will be described.

As shown in FIG. 12, the hydraulic damping device 1 includes: a cylinder 11 which extends from one side toward another side and which houses oil (a fluid); a housing 31 (a partitioning section) which is provided so as to be movable in an axial direction in the cylinder 11 and which partitions a space in the cylinder 11 into a first oil chamber Y1 (a first chamber) and a second oil chamber Y2 (a second chamber); a third valve seat 91 (a flow channel formation section) in which an extension side first oil channel 915 (a flow channel) through which the oil flows is formed in conjunction with a movement of the housing 31; an extension side first valve 93 (a valve section) which controls a flow of the oil in the extension side first oil channel 915 of the third valve seat 91; a bypass oil channel 951 (a bypass channel) which forms a flow of oil that bypasses the flow of the oil flowing through the extension side first oil channel 915 while opening the extension side first valve 93; and a throttle section 160V which throttles the flow of the oil through the bypass oil channel 951 further on the outer side than the extension side first valve 93 with respect to the third valve seat 91. Hereinafter, these components will be described in detail.
[Third Piston Section 90]

The third piston section 90 includes the third valve seat 91, a compression side valve 92 which is provided on the other side of the third valve seat 91, the extension side first valve 93 which is provided on the one side of the third valve seat 91, an extension side second valve 94 which is provided on the one side of the extension side first valve 93, a bolt 95, and a nut 96.

In addition, in the fourth embodiment, an inter-valve chamber 93Y into which oil flows is formed between the extension side first valve 93 and the extension side second valve 94.

(Third Valve Seat 91)

The third valve seat 91 is an approximately columnar member which includes an opening 91H through which the bolt 95 is passed. In addition, the third valve seat 91 includes a compression side annular section 911 which is provided on the other side, an extension side first annular section 912 which is provided on the one side, an extension side second annular section 913 which is provided on the one side of the extension side first annular section 912, a compression side oil channel 914, an extension side first oil channel 915, and an extension side second oil channel 916.

The compression side annular section 911 is formed in an approximate ring shape on the outer side in the radial direction of the opening 91H. In addition, the compression side annular section 911 protrudes toward the other side in the axial direction.

The extension side first annular section 912 is formed in an approximate ring shape on the outer side in the radial direction of the opening 91H. In addition, the extension side first annular section 912 protrudes toward the one side in the axial direction.

The extension side second annular section 913 is formed in an approximate ring shape on the outer side in the radial direction of the extension side first annular section 912. In addition, the extension side second annular section 913 protrudes toward the one side in the axial direction. Moreover, a protrusion height of the extension side second annular section 913 is higher than the extension side first annular section 912. In other words, a one side-end of the extension side second annular section 913 is positioned further on the one side than the extension side first annular section 912.

The compression side oil channel 914 has a one side-oil port positioned on the outer side of the extension side second annular section 913 in the radial direction and another side-oil port positioned on the inner side of the compression side annular section 911 in the radial direction.

The extension side first oil channel 915 has a one side-oil port positioned on the inner side of the extension side first annular section 912 in the radial direction and another side-oil port positioned on the outer side of the compression side annular section 911 in the radial direction.

The extension side second oil channel 916 has a one side-oil port positioned between the extension side first annular section 912 and the extension side second annular section 913 and another side-oil port positioned at the opening 91H of the third valve seat 91. In addition, in the fourth embodiment, the extension side second oil channel 916 (a connecting flow channel) connects to the bypass oil channel 951 (a bypass channel, to be described later) separately from the compression side oil channel 914 and the extension side first oil channel 915 (a flow channel) inside the third valve seat 91.

(Compression Side Valve 92)

The compression side valve 92 is constituted by a disc-shaped metal plate material. In addition, the compression side valve 92 is configured so as to be capable of coming into contact with the compression side annular section 911. Furthermore, the compression side valve 92 opens the compression side oil channel 914 when oil flows through the compression side oil channel 914 toward the second oil chamber Y2. Moreover, the compression side valve 92 always opens the other side of the extension side first oil channel 915.

(Extension Side First Valve 93)

The extension side first valve 93 is constituted by a disc-shaped metal plate material. In addition, the extension side first valve 93 is configured so as to be capable of coming into contact with the extension side first annular section 912. Furthermore, the extension side first valve 93 opens the extension side first oil channel 915 when oil flows through the extension side first oil channel 915 toward the first oil chamber Y1.

Moreover, the extension side first valve 93 is configured so as to be less deformable than the extension side second valve 94. In the fourth embodiment, the extension side first valve 93 is configured so as not to open at least under oil pressure that applies when the extension side second valve 94 starts to open.

(Extension Side Second Valve 94)

The extension side second valve 94 is constituted by a disc-shaped metal plate material. In addition, the extension side second valve 94 is configured so as to be capable of coming into contact with the extension side second annular section 913. Furthermore, the extension side second valve 94 opens the extension side first oil channel 915 when oil flows through the extension side first oil channel 915 toward the first oil chamber Y1. Moreover, the extension side second valve 94 opens the extension side second oil channel 916 when oil flows through the extension side second oil channel 916 toward the first oil chamber Y1.

Together with the nut 96, the bolt 95 sandwiches and holds the third valve seat 91, the compression side valve 92, the extension side first valve 93, and the extension side second valve 94. In addition, the bolt 95 includes the bypass oil channel 951. One side of the bypass oil channel 951 communicates with the housing inner chamber 31Y and another side thereof communicates with the extension side second oil channel 916. Furthermore, the bypass oil channel 951 opposes a valve section 1621 of the damping force changing section 160.

[Damping Force Changing Section 160]

The damping force changing section 160 includes a housing 161, a solenoid 61 which is provided on an inner side of the housing 161, a plunger 162 which is provided on the inner side of the solenoid 61 in the radial direction, and a spring 65.

The housing 161 holds the solenoid 61 on the inner side and is fixed to the other side of the housing 31.

The plunger 162 includes the valve section 1621 on a one side-end thereof. The valve section 1621 is provided so as to be capable of advancing and retreating with respect to the bypass oil channel 951 of the bolt 95 due to the solenoid 61. In addition, in the fourth embodiment, the valve section 1621 forms the throttle section 160V which throttles a flow of oil between the valve section 1621 and the bypass oil channel 951.

In addition, the damping force changing section 160 adjusts a throttle amount of a flow of oil through the bypass oil channel 951 in accordance with an amount by which the plunger 162 advances or retreats with respect to the bolt 95. In the fourth embodiment, the throttle section 160V forms a closed state where the flow of oil through the bypass oil channel 951 is stopped and an opened state where the flow of oil through the bypass oil channel 951 is allowed.

Moreover, with respect to the opened state, a throttle amount by the throttle section 160V may be adjusted in a plurality of stages by adjusting a protrusion amount of the plunger 162 toward the one side in accordance with an amount of current supplied to the solenoid 61.

Operations of Hydraulic Damping Device 1 According to Fourth Embodiment

Figure 13:
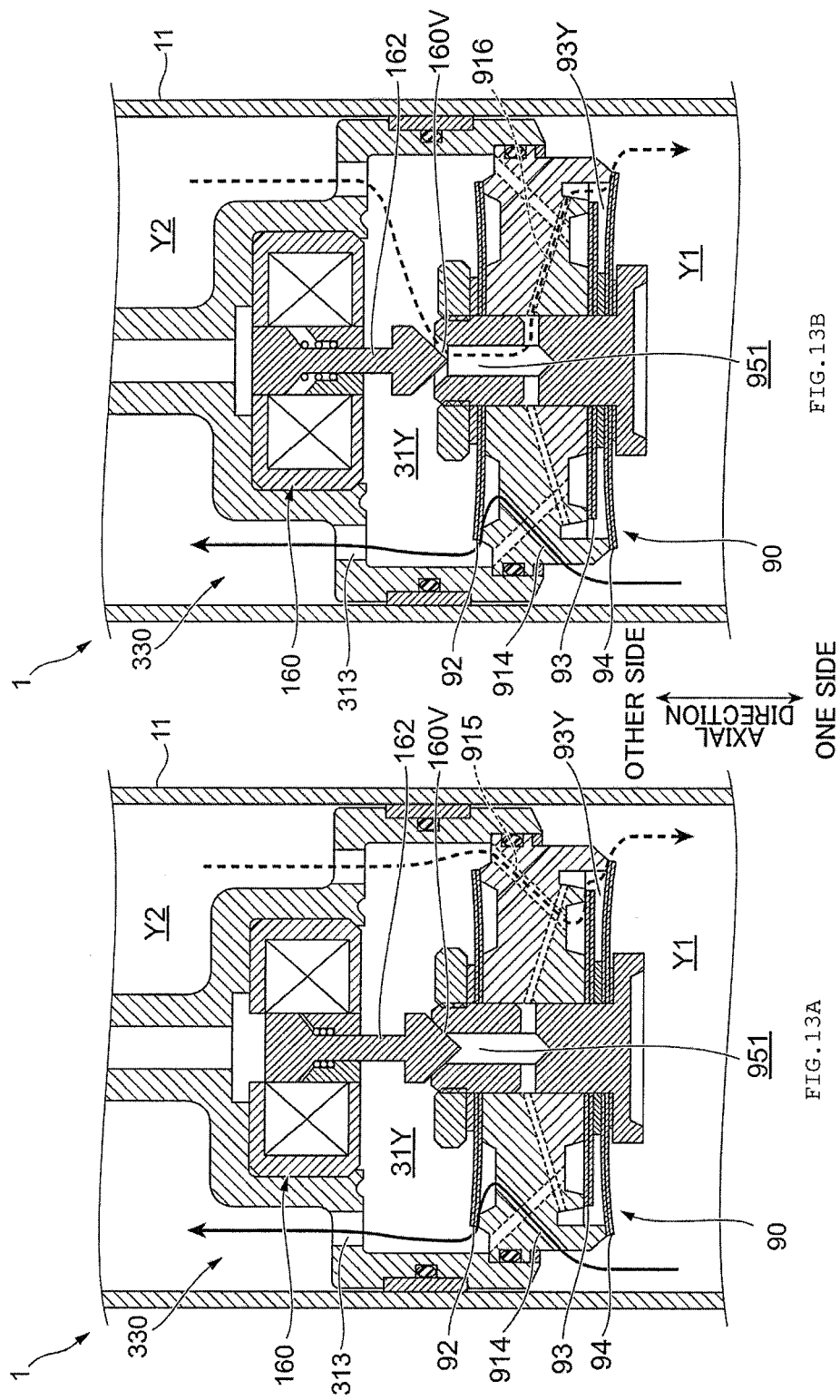
FIGS. 13A and 13B are explanatory diagrams of operations of a hydraulic damping device according to the fourth embodiment.

FIGS. 13A and 13B are explanatory diagrams of operations of the hydraulic damping device 1 according to the fourth embodiment.

Moreover, in FIGS. 13A and 13B, a flow of oil during a compression stroke will be depicted by a solid line and a flow of oil during an extension stroke will be depicted by a dashed line. In addition, FIG. 13A is a diagram showing a case where a closed state is formed in the damping force changing section 160. FIG. 13B is a diagram showing a case where an opened state is formed in the damping force changing section 160.

First, a flow of oil when the closed state is formed in the damping force changing section 160 will be described. In addition, hereinafter, descriptions applicable during a compression stroke and during an extension stroke will be respectively given in this order.

(During Compression Stroke/Closed State)

As indicated by a solid line arrow in FIG. 13A, when the piston constituting section 330 moves to the one side in the axial direction with respect to the cylinder 11, oil in the first oil chamber Y1 flows through the compression side oil channel 914 and flows out to the housing inner chamber 31Y while pressing and opening the compression side valve 92. In addition, the oil in the housing inner chamber 31Y passes through the opening 313 and flows out to the second oil chamber Y2.

As described above, during a compression stroke in the closed state, a damping force is mainly generated by resistance created when oil flows through the compression side oil channel 914 and the compression side valve 92.

(During Extension Stroke/Closed State)

As indicated by a dashed line arrow in FIG. 13A, when the piston constituting section 330 moves to the other side in the axial direction with respect to the cylinder 11, oil in the second oil chamber Y2 flows through the opening 313, the housing inner chamber 31Y, and the extension side first oil channel 915 and flows out to the inter-valve chamber 93Y while pressing and opening the extension side first valve 93. Furthermore, the oil in the inter-valve chamber 93Y flows out to the first oil chamber Y1 while pressing and opening the extension side second valve 94.

As described above, during an extension stroke in the closed state, a damping force is mainly generated by resistance created when oil flows through the extension side first oil channel 915, the extension side first valve 93, and the extension side second valve 94.

Next, a flow of oil when the opened state is formed in the damping force changing section 160 will be described.

As shown in FIG. 13B, in the opened state, a state exists where the valve section 1621 of the plunger 162 has separated from the bypass oil channel 951 and the throttle section 160V has opened.

(During Compression Stroke/Opened State)

As indicated by a solid arrow in FIG. 13B, circumstances during a compression stroke in the opened state are similar to the circumstances during a compression stroke in the closed state. In other words, during a compression stroke in the opened state, a damping force is mainly generated by resistance created when oil flows through the compression side oil channel 914 and the compression side valve 92.

(During Extension Stroke/Opened State)

As indicated by a dashed line arrow in FIG. 13B, when the piston constituting section 330 moves to the one side in the axial direction with respect to the cylinder 11, oil in the second oil chamber Y2 flows through the opening 313, the throttle section 160V, and the bypass oil channel 951. In addition, the oil in the bypass oil channel 951 flows into the extension side second oil channel 916 and flows out to the first oil chamber Y1 while pressing and opening the extension side second valve 94. In this manner, in the opened state, oil flows so as to bypass the flow of oil which presses and opens the extension side first valve 93.

As described above, during an extension stroke in the opened state, a damping force is mainly generated by resistance created when oil flows through the extension side second oil channel 916 and the extension side second valve 94. Furthermore, the damping force generated in the opened state is smaller than the damping force generated in the closed state.

As described above, even with the hydraulic damping device 1 according to the fourth embodiment, a magnitude of a generated damping force can be changed using the damping force changing section 160. In addition, in the fourth embodiment, the throttle section 160V is similarly formed further on the outer side than the valve (the compression side valve 92) with respect to the third valve seat 91. Accordingly, machining when manufacturing the hydraulic damping device 1 is simplified.

Fifth Embodiment

Figure 14:
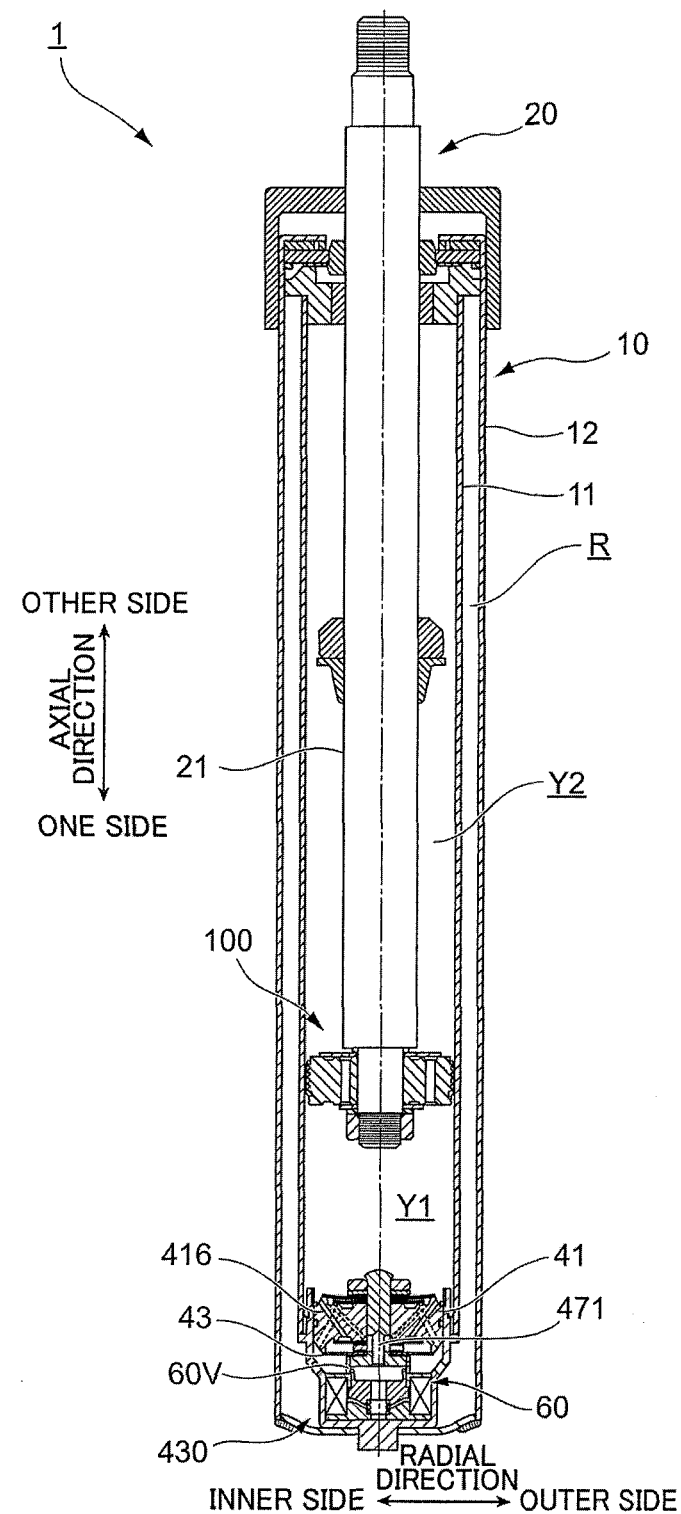
FIG. 14 is an overall configuration diagram of a hydraulic damping device according to a fifth embodiment.

FIG. 14 is an overall configuration diagram of a hydraulic damping device 1 according to a fifth embodiment.

Moreover, in the fifth embodiment, components similar to those of the other embodiments described above will be assigned same numbers and detailed descriptions thereof will be omitted.

First, an outline of the hydraulic damping device 1 according to the fifth embodiment will be described.

As shown in FIG. 14, the hydraulic damping device 1 (a pressure damping device) includes: a cylinder 11 which extends from one side toward another side and which houses oil (a fluid); a piston section 100 (a partitioning section) which is provided so as to be movable in an axial direction in the cylinder 11 and which partitions a space in the cylinder 11 into a first oil chamber Y1 (a first chamber) and a second oil chamber Y2 (a second chamber); a valve seat 41 (a flow channel formation section) in which a compression side oil channel 416 (a flow channel) through which the oil flows is formed in conjunction with a movement of the piston section 100; a compression side second valve 43 (a valve section) which controls a flow of the oil in the compression side oil channel 416 of the valve seat 41; a bypass oil channel 471 (a bypass channel) which forms a flow of the oil that bypasses the flow of the oil flowing through the compression side oil channel 416 while opening the compression side second valve 43; and a throttle section 60V which throttles the flow of the oil through the bypass oil channel 471 further on the outer side than the compression side second valve 43 with respect to the valve seat 41.

As shown in FIG. 14, the hydraulic damping device 1 according to the fifth embodiment includes a piston section 100 in place of the piston constituting section 30 according to the first embodiment and includes a bottom valve section 430 in place of the bottom valve section 70 according to the first embodiment.

The piston section 100 is attached to a one side-end of the rod member 21. In addition, in conjunction with movements of the rod member 21 on the one side and on the other side, the piston section 100 generates flows of oil between the first oil chamber Y1 and the second oil chamber Y2 and between the first oil chamber Y1 and the reservoir chamber R.

The bottom valve section 430 shares a basic configuration with the piston constituting section 30 according to the first embodiment. Furthermore, the bottom valve section 430 is provided on one side-ends of the cylinder 11 and the outer cylindrical body 12.

Moreover, even with the fifth embodiment configured as described above, the hydraulic damping device 1 can be machined easily.

Sixth Embodiment

Figure 15:
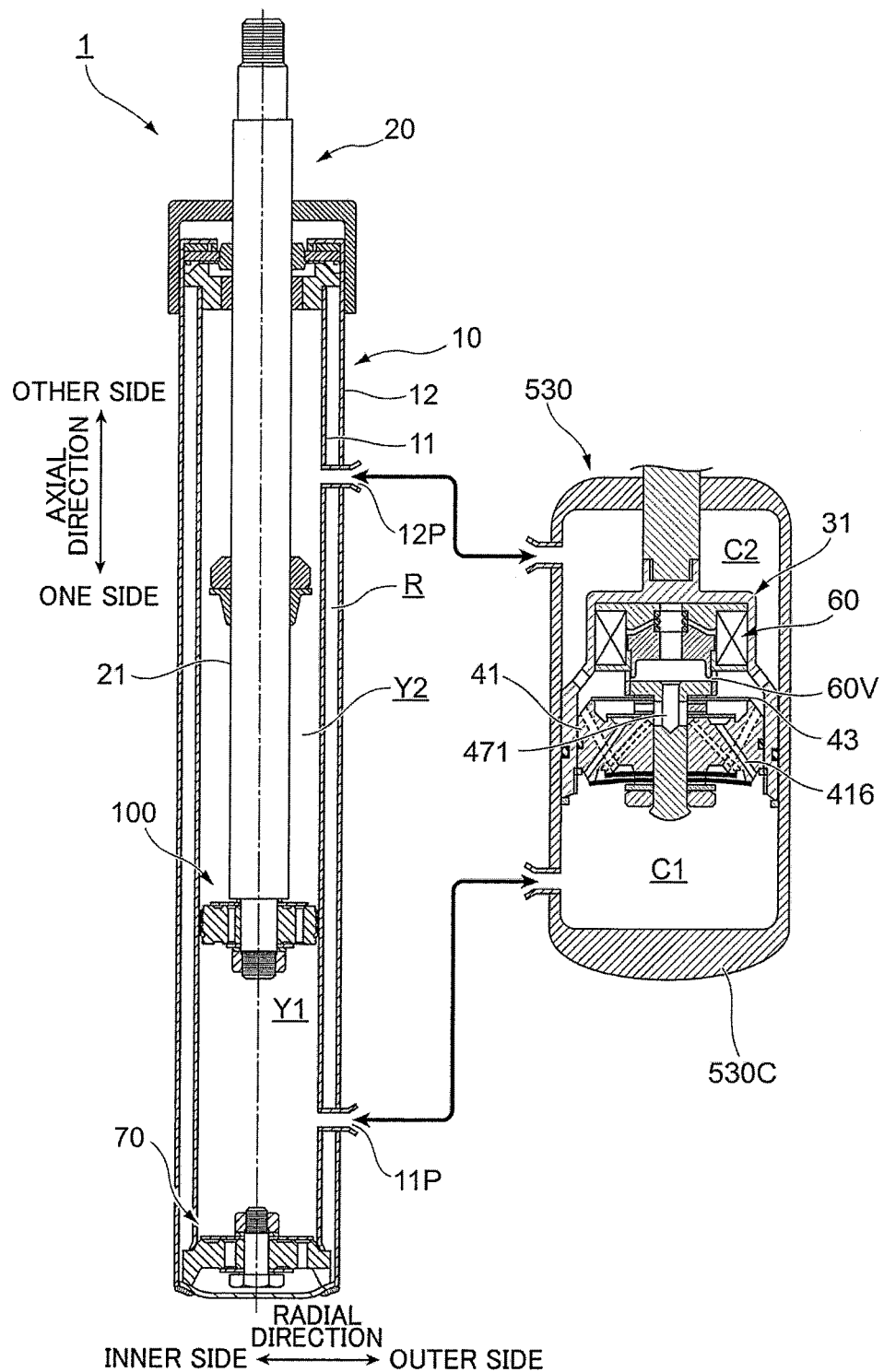
FIG. 15 is an overall configuration diagram of a hydraulic damping device according to a sixth embodiment.

FIG. 15 is an overall configuration diagram of a hydraulic damping device 1 according to a sixth embodiment.

Moreover, in the sixth embodiment, components similar to those of the other embodiments described above will be assigned same numbers and detailed descriptions thereof will be omitted.

The hydraulic damping device 1 according to the sixth embodiment includes a damping force generating unit 530. The damping force generating unit 530 shares a basic configuration with the piston constituting section 30 according to the first embodiment. In addition, the damping force generating unit 530 is provided as a separate body with respect to the cylinder section 10 and includes a second cylinder 530C which houses oil.

Next, a general configuration of the hydraulic damping device 1 according to the sixth embodiment will be described.

As shown in FIG. 15, the hydraulic damping device 1 (a pressure damping device) includes: a cylinder 11 which extends from one side toward another side and which houses oil (a fluid); a piston section 100 (a partitioning section) which is provided so as to be movable in an axial direction in the cylinder 11 and which partitions a space in the cylinder 11 into a first oil chamber Y1 (a first chamber) and a second oil chamber Y2 (a second chamber); a valve seat 41 (a flow channel formation section) in which a compression side oil channel 416 (a flow channel) through which the oil flows is formed in conjunction with a movement of the piston section 100; a compression side second valve 43 (a valve section) which controls a flow of the oil in the compression side oil channel 416 of the valve seat 41; a bypass oil channel 471 (a bypass channel) which forms a flow of the oil that bypasses the flow of the oil flowing through the compression side oil channel 416 while opening the compression side second valve 43; and a throttle section 60V which throttles the flow of the oil through the bypass oil channel 471 further on the outer side than the compression side second valve 43 with respect to the valve seat 41.

As shown in FIG. 15, in the hydraulic damping device 1 according to the sixth embodiment, a first external oil chamber C1 is formed on the one side of the housing 31 and a second external oil chamber C2 is formed on the other side of the housing 31. In addition, the first external oil chamber C1 is connected to a communicating port 11P which communicates with the first oil chamber Y1 of the cylinder 11. Furthermore, in the sixth embodiment the second external oil chamber C2 is connected to a communicating port 12P which communicates with the second oil chamber Y2 of the cylinder 11.

Moreover, even with the sixth embodiment configured as described above, the hydraulic damping device 1 can be machined easily.

As described above, even in the second to sixth embodiments, instead of directly operating the valves by electric control, the valves are indirectly controlled by switching flows of oil in oil channels by electric control.

Moreover, for example, the hydraulic damping device 1 according to the first embodiment may be configured so as to detect a rotational position of the shutter valve 64 based on an electromagnetic amount that is determined by a positional relationship between the solenoid 61 and the shutter valve 64. In addition, the hydraulic damping devices according to the second to fifth embodiments may similarly be provided with a configuration for detecting a rotational position.

As described earlier with reference to FIG. 3, depths in the axial direction of the first depressed section 631, the second depressed section 632, and the third depressed section 633 of the second cam housing 63 differ from one another. Therefore, a position of the shutter valve 64 in the axial direction differs depending on which depressed section the guided section 641 fits into. In addition, inductance varies depending on a position of the shutter valve 64 with respect to the solenoid 61. In consideration thereof, in the first embodiment, a rotational position of the shutter valve 64 may be indirectly detected based on a change in an electromagnetic amount such as an amount of current in the solenoid 61.

In addition, the damping force changing section 60 according to the first embodiment may be applied to the fourth embodiment. Furthermore, as described as the first modification, a configuration similar to the valve seat 41 constructed by joining together split members can be respectively applied to the valve seats according to the third to sixth embodiments. Moreover, as described as the second modification, a configuration not provided with the housing 31 can be respectively applied to the third to sixth embodiments.

Furthermore, although the hydraulic damping device 1 has a so-called double-tube structure in the first to sixth embodiments described above, the hydraulic damping device 1 is not limited thereto and may have a so-called triple-tube structure. Moreover, the bottom valve section 70 according to the first to fourth embodiments and the sixth embodiment as well as the piston section 100 according to the fifth and sixth embodiments are not limited to the structures described in the embodiments above and may have other shapes and configurations as long as functions as a damping mechanism are provided.

EXPLANATION OF REFERENCE NUMERALS 1 hydraulic damping device (an example of a pressure damping device)
11 cylinder (an example of a cylinder)
30 piston constituting section
31 housing (an example of a partitioning section)
41 valve seat (an example of a flow channel formation section)
42 compression side first valve (an example of an inner valve section)
43 compression side second valve (an example of an outer valve section)
60 damping force changing section
60V throttle section (an example of a throttle section)
61 solenoid (an example of a driving section)
64 shutter valve (an example of a protruding member)
83 damping valve (an example of a two-way valve)
811 bypass oil channel (an example of a bypass channel)

What is claimed is:

1. A pressure damping device comprising:
a cylinder that extends from one side toward another side and that houses a fluid;
a partitioning section that is provided so as to be movable in an axial direction in the cylinder and that partitions a space in the cylinder into a first chamber and a second chamber;
a flow channel formation section in which a flow channel, through which the fluid flows, is formed in conjunction with a movement of the partitioning section;
a valve section that controls a flow of the fluid in the flow channel of the flow channel formation section, said valve section having a compression side valve section and an extension side valve section;
a bypass channel that forms a flow of the fluid that bypasses the flow of the fluid flowing through the flow channel while opening the valve section; and
a throttle section that throttles the flow of the fluid through the bypass channel on the other side of the valve section in the axial direction with respect to the flow channel formation section, wherein
the other side is an upper side in the axial direction,
the throttle section is axially aligned with and provided above the valve section, and
the bypass channel forms both one flow of the fluid that flows through the flow channel while opening the compression side valve section in conjunction with a movement of the partitioning section toward the one side and another flow of the fluid that bypasses the flow channel while opening the extension side valve section in conjunction with a movement of the partitioning section toward the other side.

2. The pressure damping device according to claim 1, further comprising
a protruding member that rotates by being driven in the axial direction by a driving section and that protrudes at a prescribed protrusion amount toward the bypass channel in accordance with an amount of rotation, wherein
the throttle section adjusts a throttle amount of the fluid in accordance with the protrusion amount of the protruding member.

3. The pressure damping device according to claim 1, wherein the partitioning section is configured to surround the flow channel formation section and the valve section.

4. The pressure damping device according to claim 1, wherein
the compression side valve section includes a first valve that causes the fluid to flow by opening the flow channel regardless of a flow of the fluid through the bypass channel, and a second valve that extends further toward an outer side in the radial direction than the first valve and that is configured to prevent the fluid from flowing in the flow channel when the fluid flows through the bypass channel, and the first valve is provided on the one side in the axial direction with respect to the second valve.

\* \* \* \* \*